United States Patent
Peyton Jones

(10) Patent No.: US 10,055,197 B1
(45) Date of Patent: *Aug. 21, 2018

(54) DIFFERENTIAL RECURSIVE EVALUATION

(71) Applicant: SEMMLE LIMITED, Oxford (GB)

(72) Inventor: Michael Peyton Jones, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,090

(22) Filed: May 25, 2017

(51) Int. Cl.
G06F 17/13 (2006.01)
G06F 7/64 (2006.01)

(52) U.S. Cl.
CPC ..................... G06F 7/64 (2013.01)

(58) Field of Classification Search
CPC ....................................... G06F 17/13
USPC .......................................... 708/443
See application file for complete search history.

(56) References Cited

U.S. PATENT DOCUMENTS

| | | | |
|---|---|---|---|
| 8,090,730 B2 | 1/2012 | Shahabi et al. | |
| 9,996,583 B1 * | 6/2018 | Peyton Jones | G06F 17/30513 |
| 2002/0029207 A1 | 3/2002 | Bakalash et al. | |
| 2002/0198872 A1 | 12/2002 | MacNicol et al. | |
| 2003/0204499 A1 | 10/2003 | Shahabi et al. | |
| 2004/0034514 A1 * | 2/2004 | Langemyr ............... | G06F 17/12 703/2 |

OTHER PUBLICATIONS

Bancilhon, "Naive evaluation of recursively defined relations," Springer-Verlag New York Inc, 1986, 16 pages.
Bancilhon et al., "An amateur's introduction to recursive query processing strategies," vol. 15. ACM, Jun. 1986, 46 pages.
Dong et al., "Incremental maintenance of recursive views using relational calculus/sql," ACM SIGMOD Record, 2000, 8 pages.
Griffin et al., "An improved algorithm for the incremental recomputation of active relational expressions," IEEE Transactions on Knowledge & Data Engineering, (3):508 511, 1997, 4 pages.
Gupta et al., "Maintaining views incrementally," ACM SIGMOD Record, 22(2):157 166, 1993, 10 pages.

(Continued)

*Primary Examiner* — David H Malzahn
(74) *Attorney, Agent, or Firm* — Fish & Richardson P.C.

(57) ABSTRACT

Methods, systems, and apparatus, including computer programs encoded on computer storage media, for performing differential recursive evaluation. One of the methods includes receiving an original recursive expression that defines tuples belonging to an output relation. A final delta expression is generated including repeatedly applying one or more delta rules to the initial delta expression, wherein the final delta expression has at least one call to a delta relation that represents tuples generated by the final delta expression on a previous iteration. Until the final delta expression generates no new tuples, the final delta expression is evaluated using the tuples computed by the final delta expression on the previous iteration wherever the call to the delta relation occurs and the output relation is updated including adding to the output relation any tuples newly generated by evaluating the final delta expression.

30 Claims, 5 Drawing Sheets

(56) References Cited

OTHER PUBLICATIONS

Harrison et al., "Maintenance of materialized views in a deductive database: an update propagation approach," In Work-shop on Deductive Databases, JICSLP, Nov. 14, 1992, pp. 56-65.
Qian et al., "Incremental recomputation of active re-lational expressions," Knowledge and Data Engineering, IEEE Transactions on Knowledge and Data Engineering, Sep. 1991, 5 pages.
Madsen et al., From Datalog to FLIX: A Declarative Language for Fixed Points on Lattices, Jun. 13-17, 2016, 15 pages.
Lenz et al., OLAP Databases and Aggregation Functions, 200L IEEE, 91-100.

\* cited by examiner

DIFFERENTIAL RECURSIVE EVALUATION

BACKGROUND

This specification relates to data processing, in particular, to processing recursive statements.

Some query languages support recursive statements, which are statements that reference their own output. Example query languages that support recursive statements include Datalog and SQL.

Query languages operate on relations. A relation is a set of tuples $(t_1, \ldots, t_n)$, each tuple having n data elements $t_1$. Each element $t_1$ represents a corresponding value, which may represent a value of a corresponding attribute having an attribute name. Relations are commonly thought of as, represented as, and referred to as tables in which each row is a tuple and each column is an attribute. However, a relation need not be implemented in tabular form, and the tuples belonging to a relation can be stored in any appropriate form.

The following query language expression, expressed in Datalog-like pseudocode, is an expression having a recursive term:

ancestor (x, y):-parent (x, y) OR
exists (z: parent (x, z) AND ancestor (z, y))

This statement recursively defines what it means for someone to be an ancestor according to tuples belonging to a "parent" relation that defines parent/child relationships.

The statement indicates that a person x is an ancestor of a person y if (1) the person x is a parent of the person y, according to the "parent" relation, or if (2) there is an intervening person z such that the person x is the parent of the person z according to the "parent" relation and the person z is an ancestor of the person y according to the "ancestor" relation. This statement recursively defines tuples belonging to the "ancestor" relation because the definition of "ancestor" depends on its own output.

As used in this description, an expression is a query language statement having one or more terms. A term includes parts of a program that can be joined by conjunctions and disjunctions. Terms therefore can include predicate calls, existentials, and universals, to name just a few examples.

The :- symbol is an assignment operator that assigns the predicate expression ancestor(x,y) to have the body "parent (x,y) OR exists(z: parent(x,z) AND ancestor(z,y))." The second term in this definition has an existential quantifier, represented by the "exists" operator. A term having an existential quantifier may be referred to as an existential term. This existential term asserts that there is a person z such that a person x is the parent of the person z and that the person z is an ancestor of a person y.

The semantics of this statement in a query language having fixed point semantics is that the body of ancestor(x,y) is evaluated to compute an associated "ancestor" relation for the predicate. The associated ancestor relation can be defined by computing the least fixed point of the statement. A fixed point for a statement is a set of tuples that, when provided as input to the statement, reproduces the set of input tuples. In other words, a fixed point exists when a set of output tuples generated from a set of input tuples is identical to the set of input tuples.

The least fixed point is a fixed point having tuples that are contained within all other fixed points for the statement. In this example, the least fixed point ends up being a set of tuples (x,y) that make the definition of ancestor(x,y) true for all available input data. Evaluation engines that evaluate recursive predicates can compute a least fixed point for a statement by providing the empty relation as input to the statement and then repeatedly providing the result to the statement. When no additional tuples are generated, the least fixed point has been reached.

A related result is the greatest fixed point. The greatest fixed point is a fixed point having tuples that contain all other fixed points for the statement. A greatest fixed point can be computed by providing the set of all tuples as input to the statement and then repeatedly providing the result to the statement.

The semantics of query languages often means that after computing tuples that belong to a particular relation for a statement, e.g., the "ancestor" relation, when actual tuple values are provided as input to the statement, the statement evaluates to true if the input tuple occurs in the relation and evaluates to false otherwise. In other words, "ancestor(x,y)" means the set of all ancestor pairs, while "ancestor("Bob", "Ted")" means that the tuple ("Bob", "Ted") is in the "ancestor" relation. For example, after computing tuples that belong to the "ancestor" relation, when an actual tuple value having values for x and y is provided as input to the "ancestor" predicate, the statement evaluates to true if the ancestor relation has a tuple with the values for x and y. The statement evaluates to false otherwise. Evaluation of predicates is typically performed by an evaluation engine for the query language implemented by software installed on one or more computers.

The relation for which a predicate is evaluated may be specified within the body of the predicate, by tuples in another relation, or some combination of these. In this example, the body of ancestor(x,y) itself indicates that some tuples will be specified by the "parent" relation. However, other tuples will be deduced by evaluating the recursive statement from the body of the predicate.

Some methods for finding fixed points of a recursive statement recast the statement into a number of nonrecursive evaluation statements. The evaluation statements are then evaluated in sequence until a least fixed point is reached. In general, recasting a recursive statement into a number of nonrecursive evaluation statements may be referred to as "flattening" the recursion.

An evaluation engine for a particular query language can recast a recursive statement as follows. A first nonrecursive statement is defined as being the empty relation. A sequence of subsequent nonrecursive evaluation statements are defined according to the body of the recursive statement. In doing so, the evaluation engine can replace each recursive term with a reference to a previous nonrecursive evaluation statement. Logically, the number of nonrecursive evaluation statements that can be generated is unbounded. However, the evaluation engine will halt evaluation when a fixed point is reached.

The evaluation engine then evaluates the nonrecursive evaluation statements in order and adds any resulting tuples to the associated relation for the statement. The evaluation engine stops when a nonrecursive evaluation statement is reached whose evaluation adds no additional tuples to the associated relation. The final result is the associated relation for the recursively defined statement.

When using this strategy for recursive evaluation, evaluating each successive evaluation statement regenerates all of the results that have already been generated. Because of this inherent duplication, this approach is sometimes referred to as "naive evaluation.", As the associated relation for a recursive statement grows larger, each iteration requires more time and effort to compute because every iteration recomputes all of the previously computed results.

To implement naive evaluation for the "ancestor" predicate above, an evaluation engine can recast the "ancestor" predicate into the following nonrecursive evaluation predicates:

ancestor$_0$(x,y):-{ }
ancestor$_1$(x,y):-parent(x,y) OR exists(z: parent(x,z) AND ancestor$_0$(z,y))
ancestor$_2$(x,y) parent(x,y) OR exists(z: parent(x,z) AND ancestor$_1$(z,y))
. . .

Or, for brevity, the evaluation predicates may be represented as:

ancestor$_0$(x,y):-{ }
ancestor$_{n+1}$(x,y) parent(x,y) OR exists(z: parent(x,z) AND ancestor$_n$(z,y))

At first glance, this notation may look like a recursive definition, but it is not. This is because the subscripts of the predicates denote different nonrecursive predicates occurring in a potentially unbounded sequence of evaluation predicates. In other words, the predicate ancestor$_{+1}$ is not recursive because it references ancestor$_n$, but not itself.

The evaluation engine then evaluates the nonrecursive predicates in order to find the least fixed point. One primary drawback with naive evaluation is that each time ancestor$_n$(z, y) is evaluated, the system reproduces all the tuples that have ever been generated. This effect is a notorious computational bottleneck in both time and space.

Another prior art procedure for evaluating recursive statements is often referred to as "semi-naive evaluation." When using semi-naive evaluation, an evaluation engine flattens the recursion of a recursive statement in a different way than for naive evaluation. In particular, the evaluation engine defines a "delta predicate" whose associated relation is defined to include new tuples generated on each iteration. The least fixed point is then found when an iteration is reached in which the delta predicate's associated relation is empty. In other words, when the delta predicate is empty, no new tuples have been generated, and the least fixed point has been reached.

To evaluate a recursive statement having N recursive calls, an evaluation engine generates N different evaluation predicates. Each of the N evaluation predicates replaces a different recursive call with a call to delta relation. The overall delta relation is then defined as a disjunction of all N evaluation predicates.

For example, an evaluation engine can use semi-naive evaluation to recast the ancestor definition into the following evaluation predicates:

$\Delta$ancestor$_0$(x,y):-{ }
ancestor$_0$(x,y):-{ }
$\Delta$ancestor$_{n+1}$(x,y):-(parent(x,y) OR exists(z: parent(x,z) AND $\Delta$ancestor$_n$(z,y))) AND NOT ancestor$_n$(x,y)
ancestor$_{n+1}$(x,y):-ancestor$_n$(x,y) OR $\Delta$ancestor$_{n+1}$(x,y)

In this example, the delta predicate also includes an explicit "AND NOT" term that defines the delta relation to exclude any previously generated tuples.

Therefore, semi-naive evaluation tends to produce fewer duplicate tuples compared to naive evaluation. However, semi-naive evaluation is defined only for a very restricted class of programs, in particular, programs that contain only disjunctions of conjunctions of predicate calls.

In addition, in practice, computing the "and not" term in $\Delta$ancestor$_{n+1}$(x,y) for semi-naive evaluation can be extremely expensive for any data set of considerable size. As the associated relation grows, computing what is not in the relation becomes a more computationally expensive task because each newly generated tuple must be checked against every other tuple in the relation to determine whether or not it has already been generated.

And even worse, semi-naive evaluation is not even defined for more complex programs. This means that for some expressions, semi-naive evaluation cannot be used at all. In contrast, because naive evaluation simply recomputes all the previously generated tuples all the time, this approach is computationally sound because all the required information is always available to be used to compute the correct result.

In sum, naive evaluation is very computationally inefficient in time and space. While semi-naive evaluation provides some computational benefits, it is not defined for all expressions.

SUMMARY

This specification describes how a system can evaluate recursive statements using differential recursive evaluation. Differential recursive evaluation allows an evaluation engine to compute new tuples (that are to be added or removed) on each iteration by evaluating expressions that define how to compute the new tuples using previous tuples generated on a previous iteration. Importantly, the evaluation engine can generate the expressions to be evaluated on each iteration automatically from an original recursive expression.

Computing new tuples using tuples produced on a previous iteration is usually vastly more efficient than using all tuples ever produced, which is what is required for naive evaluation described above. To compute the new tuples, differential recursive evaluation can use approximate difference operators that are guaranteed to produce new tuples, but which might generate tuples that already exist (in the case of tuples to be added) or tuples that were already removed (in the case of tuples to be removed). The key insight is to sacrifice some precision between iterations in order to gain dramatic speed-ups in computation.

Particular embodiments of the subject matter described in this specification can be implemented so as to realize one or more of the following advantages. Evaluating recursive statements using differential evaluation is faster than naive evaluation on all expressions and applicable to a larger class of recursive statements than semi-naive evaluation. The framework can be used to handle negations in a sound way. The framework can be used to compute anti-monotonic results if a fixed point exists. Using approximate difference operators gracefully degrades while remaining computationally sound. The final delta expressions and epsilon expressions generated by the system are simply other terms that can still be optimized like any other terms. Using the differential evaluation framework also provides increased language flexibility because the framework makes it easier to add new recursive language features and to compute the new features differentially. All that is required is to simply define new delta rules and possibly epsilon rules for the new features and the rest of the framework remains computationally sound.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
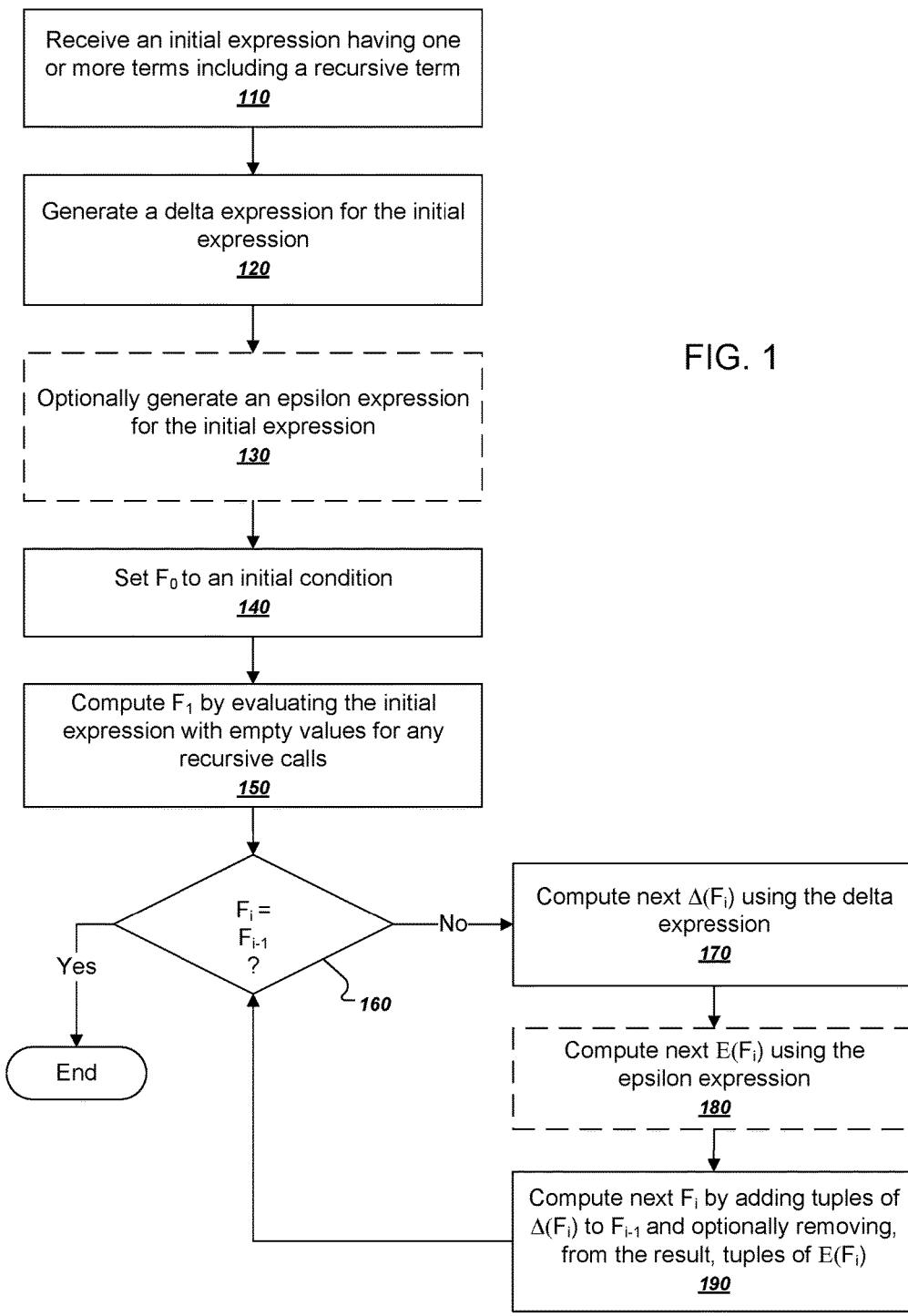
FIG. 1 is a flow chart of an example process for using approximate difference operators to compute a fixed point.

The specification describes techniques for iteratively evaluating recursively defined relations by finding fixed points using approximate difference operators. Approximate difference operators are expressions that define how to compute tuples that have changed between iterations of recursive evaluation in a computationally sound way. Therefore, approximate difference operators can generate both tuples to be added to a relation as well as tuples that should be removed from a relation between iterations of a recursive evaluation process. This process is designed to evaluate a recursive expression using, to the extent possible, only tuples that have changed between iterations generated by the approximate difference operators. Therefore, this process can be referred to as "differential evaluation" or "incremental evaluation."

Approximate difference operators do not, however, necessarily define exactly what has changed between iterations. In that respect, approximate difference operators should be contrasted with exact difference operators that always define exactly what has changed on each iteration. Unlike approximate difference operators, exact difference operators always generate exactly the tuples that should be added to a relation and exactly the tuples that should be removed from a relation between iterations.

One motivation for using approximate difference operators instead of exact difference operators is that using approximate difference operators tends to be drastically more efficient. Relative to exact difference operators, using approximate difference operators sacrifices some precision between iterations, but the final result is always exactly the same and nearly always takes less work to compute.

Therefore, "approximate" in this sense means that the computed differences between each iteration are often less exact than the differences computed by exact difference operators. This can mean that sometimes approximate difference operators produce tuples that already belong to the associated output relation. This can also mean that sometimes approximate difference operators specify the removal of tuples from the relation that do not actually belong to the relation. This is in direct contrast to exact difference operators, which always exhaustively compute exactly what is new and exactly what should be removed.

Therefore, "approximate," as it is used in this specification, does not imply that there is any uncertainty involved in the computation. Rather, all of the operations involved and how all of the tuples are produced are defined precisely. The term "approximate" instead indicates that a computationally sound result can be computed even without computing exact differences.

As used in this specification, approximate difference operators include delta expressions and optionally, epsilon expressions. These expressions can be collectively referred to as differential expression.

Delta expressions define how to compute tuples to be added to the output relation on each iteration, which for brevity can be referred to as the "upward differences" for that iteration because they make the output relation bigger. As an approximate difference operator, a delta expression may generate, for some iterations, some tuples to be added that already belong to the output relation.

Conversely, epsilon expressions define how to compute tuples to be removed from the output relation on each iteration, which for brevity can be referred to as the "downward differences" for that iteration because they make the output relation smaller. As an approximate difference operator, an epsilon expression may generate, for some iterations, some tuples to be removed that do not actually belong to the output relation.

The system can generate a delta expression to evaluate by applying one or more differential rules to the original recursive expression. Similarly, the system can generate an epsilon expression to evaluate by applying one or more differential rules to the original recursive expression. Differential rules can include delta rules, epsilon rules, gamma rules, or some combination of these. Each differential rule specifies a mapping from one expression to another expression in a way that is always computationally sound and which is designed to save work.

One possible goal is to generate a delta expression and an epsilon expression that use only tuples that have changed since the last iteration. For example, some differential rules discard nonrecursive disjunctive terms from the delta expression because such nonrecursive terms have no impact on tuples that are generated on each iteration. Therefore, evaluating the delta expression on each iteration does not require considering the nonrecursive disjunctive terms of the original expression at all.

Another advantage of using the approximate difference operator framework is that it gracefully degrades to naive evaluation while remaining computationally sound. That is to say, if the system applies no delta rules and no epsilon rules and simply uses the original expression as the delta expression and the epsilon expression, the evaluation process closely resembles naive evaluation. Therefore, unforeseen or difficult expressions can still be evaluated correctly without special error handling.

Thus, using approximate difference operators can be conceptualized as lying somewhere between naive evaluation and using exact difference operators. In the best case, the approximate difference operators generate exact differences using much less work than evaluating exact difference operators would have required. In the worst case, the approximate difference operators gracefully degrade to naive evaluation while remaining computationally sound. Where an approximate difference operator lies on this spectrum is highly dependent upon the computation context, including the expression being evaluated and the data in the underlying relations.

Epsilon expressions are described as being optional because some systems do not allow terms to be removed from a relation when computing a fixed point. For example, systems that do not support negation of any kind may actually forbid such removal operations. Therefore, in such systems, generating epsilon expressions is not required. However, epsilon rules are desirable for supporting negation. In such cases, epsilon terms can be used to handle the downward differences required to evaluate negated terms.

Notably, the framework described in this specification is actually completely independent from any specific monotonicity requirements that may or may not be imposed by an underlying evaluation system. Therefore, the same techniques can be used equally to compute anti-monotonic results differentially, e.g., by computing the greatest fixed point by successive application of epsilon terms from the set of all tuples.

In addition, the framework described here makes no assumptions at all about whether or not a fixed point even exists. If a fixed point does exist, the techniques described here can be used to compute it differentially. And if a fixed point does exist, computing it differentially can be dramatically more efficient than prior art techniques.

FIG. 1 is a flow chart of an example process for using approximate difference operators to compute a fixed point. In general, an evaluation engine of a particular query language receives an expression having a recursive term expressed in the particular query language. The evaluation engine will then compute the tuples belonging to an associated relation for the expression until a fixed point is reached. That is, the process continues until evaluation of the expression using previously generated tuples produces no new tuples to add or remove. The process will be described as being performed by an appropriately programmed system of one or more computers.

The system receives an initial expression having one or more terms including a recursive term (110). As described above, the expression operates on an associated relation of tuples. The system then generates one or more approximate difference operators.

The system generates a delta expression for the initial expression (120). The delta expression is an approximate difference operator that specifies how to compute tuples to be added to the relation based on what has changed on each iteration. As an approximate difference operator, the delta expression can generate some tuples that already belong to the relation.

The system optionally generates an epsilon expression for the initial expression (130). The epsilon expression is an approximate difference operator that specifies how to compute tuples to be removed from the relation on each iteration.

As an approximate difference operator, the epsilon expression can generate some tuples for removal that were not actually in the relation. Thus, on some iterations, the epsilon expression can generate some tuples that should be removed that are in the relation and some tuples that are not in the relation.

Generating an epsilon expression is optional for systems where negation is not allowed. Even systems that require strict monotonicity may also evaluate negated subterms, e.g., terms that are under an even number of negations, and such terms can be evaluated efficiently using epsilon expressions.

As described above, by computing epsilon expressions, the system can compute results for anti-monotonic expressions. For example, the system can compute the greatest fixed point by evaluating the epsilon expression from the set of all tuples. In this case, the epsilon expression is required and the delta expression is optional.

Key terms of approximate difference operators will now be briefly described.

A delta relation contains tuples to be added to a relation on a particular iteration. In this specification, a call to a delta relation for a term F on iteration i will be expressed as "$\Delta(F_i)$". The system can, on all iterations but the first iteration, compute the tuples in the delta relation on iteration i by evaluating the delta expression, which is an approximate difference operator. On the first iteration the system can compute the tuples in the delta relation by evaluating the initial expression with an initial condition and determining what has been added relative to the initial condition.

An epsilon relation contains tuples to be removed from a relation on a particular iteration. In this specification, a call to the epsilon relation for a term F on iteration i will be expressed as "$E(F_i)$". The system can, on all iterations but the first iteration, compute tuples in the epsilon relation on iteration i by evaluating the epsilon expression, which is also an approximate difference operator. On the first iteration, the system can compute the tuples in the epsilon relation by evaluating the initial expression with an initial condition and determining what has been removed relative to the initial condition.

To generate an approximate difference operator, the system can apply one or more differential functions to the initial expression. Each differential function takes an input expression having one or more terms. To resolve a differential function in an expression, the system applies one or more differential rules to terms under the differential function to produce an output expression. During this process, other terms under other differential functions can be generated. The system can then repeatedly resolve those differential functions, until no terms in the output expression are under any differential functions. The system can then use the final output expression as an approximate difference operator.

The differential functions generally include a delta function, an epsilon function, and optionally, a gamma function. Each differential function has a different set of differential rules that are considered. In other words, to resolve a call to the delta function, the system can consider a set of delta rules. To resolve a call to the epsilon function, the system can consider a set of epsilon rules. And to resolve a call to the gamma function, the system can consider a set of gamma rules. Implementing the gamma function is not strictly necessary because its operations can also be expressed purely in terms of the delta function and the epsilon function. But in reasoning about a program's behavior, gamma functions provide a useful shorthand.

To generate a delta expression, the system first applies the delta function to the initial expression and then repeatedly resolves all resulting terms under differential functions until no more terms under differential functions remain. Similarly, to generate an epsilon expression, the system first applies the epsilon function to the initial expression and then repeatedly resolves all terms under differential functions until no more terms under differential functions remain. This process is recursive in that the output of any differential function can generate other calls to other differential functions. This process is described in more detail below with reference to FIG. 2.

After resolving all differential functions, the final delta expression or final epsilon expression will have no recursive calls and may have calls to one or more delta relations, epsilon relations, or both.

A delta term is a term under a call to the delta function. In the notation of this specification, a delta term X under a call to the delta function will be denoted by "$\delta(X)$". The "$\delta$" syntax indicates a call to the delta function. For brevity, when the examples below refer to a delta term "$\delta(X)$" having tuples, this means tuples generated by the resulting expression after fully resolving the call to the delta function and any resulting calls to any other differential functions.

An epsilon term is a term under a call to the epsilon function. In the notation of this specification, an epsilon term X under a call to the epsilon function will be denoted by "$\varepsilon(X)$". The "$\varepsilon$" syntax indicates a call to the epsilon function. For brevity, when the examples below refer to an epsilon term "ε (X)" having tuples, this means tuples generated by the resulting expression after fully resolving the call to the epsilon function and any resulting calls to any other differential functions.

A gamma term is a term under a call to the gamma function. In the notation of this specification, a gamma term X under a call to the gamma function will be denoted by "γ (X)". The "γ" syntax indicates a call to the gamma function. The gamma function can be implemented for a term X using (1) the state of a relation for X on the prior iteration, (2) the delta function, and (3) the epsilon function, as follows:

γ (X)=(X OR δ (X)) AND NOT ε (X).

This expression means that the relation for a gamma term X includes tuples in X, plus tuples generated by the result of "δ (X)", minus tuples generated by the result of "ε (X)". The gamma function applied to X can be thought of as the next "stage" of computation for X, if X includes a recursive call. For brevity, when the examples below refer to a gamma term "γ (X)" having tuples, this means tuples generated by the resulting expression after fully resolving the call to the gamma function and any resulting calls to any other differential functions. Or, in systems that do not implement a gamma function, where reference is made to a gamma term having tuples, this means tuples generated by "(X OR δ (X)) AND NOT ε (X)" after fully resolving the call to the delta function and the call to the epsilon function and any resulting calls to any other differential functions.

A system can implement each of the differential functions, e.g., "δ", "ε", and "γ", as function in an underlying programming language of the evaluation engine. Alternatively or in addition, the system can explicitly or implicitly designate terms in an expression as being under a differential function. For example, the system can hide the implementation details from users and simply tag a term or its internal representation, e.g., in an abstract syntax tree, with a designator that changes the semantics of the term from meaning tuples belonging to a relation corresponding to the term in general to meaning a term that should be further resolved according to the appropriate differential functions.

Thus, an evaluation engine can reinterpret an initial term X as being under a call to a differential function in any appropriate way. For example, a system can generate an initial delta expression from an initial expression by explicitly calling a delta function with the initial expression as input. Alternatively or in addition, a system can generate an initial delta expression from an initial expression by reinterpreting the initial expression as being under a call to the delta function. Similarly, a system can generate an initial epsilon expression from an initial expression by explicitly calling an epsilon function or by reinterpreting the initial expression as being under a call to the epsilon function.

For example, the system can generate an initial delta expression for the initial "ancestor" expression by re-expressing or re-interpreting the terms of the initial expression as being under a call to the delta function implicitly or explicitly.

In other words, the initial expression,
parent(x,y) OR exists(z: parent(x,z) AND ancestor(z,y))
can be converted to the following initial delta expression:
δ(parent(x,y) OR exists(z: parent(x,z) AND ancestor(z, y))).

In the notation of this specification, the terms of the original expression for "ancestor(x,y)" can be reinterpreted as being under a call to the delta function, e.g., by applying a call to the delta function, e.g., "δ(X)", to the definition of "ancestor".

After generating an initial delta expression, the system can transform the initial delta expression using one or more differential rules into a final delta expression. The system can then compute the upward differences on each iteration by evaluating the final delta expression instead of evaluating the initial recursive expression.

Similarly, the system can transform an initial epsilon expression using one or more differential rules into a final epsilon expression. The system can then compute the downward differences on each iteration by evaluating the final epsilon expression instead of evaluating the initial recursive expression.

For example, the system can transform the initial delta expression for "ancestor(x,y)" using a suitable set of differential rules into the following final delta expression:

δ (ancestor(x, y)):-exists(z: parent(x, z) AND Δ (ancestor (z, y))).

This statement means that to compute tuples that should be added to the "ancestor" relation on iteration 1+1, the system should evaluate the expression "exists(z: parent(x, z) AND Δ (ancestor(z, y)))", where "Δ(ancestor(z, y))" is a call to the delta relation that contains the tuples that were generated for the "ancestor" relation on iteration i. In other words, the system will try to find a person z who (i) occurs in a tuple in the parent relation as a child of x and (ii) also occurs as an ancestor of a person y according to tuples that were generated for the "ancestor" relation on a previous iteration i.

Therefore, for clarity, subscripts can be used to make the interpretation explicit:

δ (ancestor$_{i+1}$(x, y)):-exists(z: parent(x, z) AND Δ (ancestor$_i$(z, y))).

Notably, this expression does not specify matching up tuples in the parent relation with all tuples in the "ancestor" relation. Rather, the expression specifies only matching up tuples in the parent relation with tuples that were generated for the "ancestor" relation on the last iteration. This is because the set of delta rules transformed the term "ancestor (z,y)" in the original expression to be a call to the delta relation, "Δ (ancestor$_i$(z, y)". This transformation reduces the scope of tuples to be considered. In other words, instead of the system considering all tuples in the "ancestor" relation, the system will only consider tuples in the delta relation of the last iteration.

Another transformation of note for this delta expression is that the set of delta rules transformed the original expression to completely remove the nonrecursive disjunct "parent(x, y)", which was previously the first term of the expression. Therefore, the system will not re-add tuples from the parent relation to the "ancestor" relation on each iteration as naive evaluation would do.

Generating delta expressions and epsilon expressions is described in more detail below with reference to FIG. 2.

After generating a delta expression and, optionally, an epsilon expression, the system can evaluate the recursive statement using differential evaluation. But first, the system can bootstrap the process by performing an initial iteration that evaluates nonrecursive disjunctive terms. In general, the bootstrapping steps do not use the approximate difference operators. In the description below, the relation at iteration i will be referred to as $F_i$.

To start the bootstrapping process, the system sets $F_0$ to an initial condition (140). When computing the least fixed point, the initial condition is usually the empty relation, but need not be. In the "ancestor" example, the system can set the "ancestor" relation to be initially empty. Alternatively, the system can initialize the "ancestor" relation with an initial condition having one or more tuples.

When computing the greatest fixed point, the initial condition is usually the set of all tuples or a set of tuples that are known to be greater than any fixed point.

The system computes $F_1$ using the initial expression with empty values for any recursive calls (150). In some implementations, when the recursive calls are considered to be empty, the system can further simplify the initial expression. For example, suppose the original expression included "X AND (Y OR Z)", and Y is a recursive call. By setting the recursive call to Y to be empty, the system can simplify the initial expression to "X OR Z" on this iteration.

For example, in the "ancestor(x,y)" expression, when the recursive call to "ancestor" is considered to be empty, the initial expression can be simplified to include only the first term "parent(x,y)." Therefore, to evaluate $F_1$ for "ancestor" the system can simply evaluate "parent(x,y)", which results in adding all tuples in the parent relation to the "ancestor" relation.

The system determines whether or not $F_i = F_{i-1}$ (160). In other words, the system determines whether or not a fixed point has been reached. If not, the system begins incremental evaluation by repeatedly evaluating the approximate difference operators instead of repeatedly evaluating the initial expression.

To do so, the system computes the next the next $\Delta(F_i)$ relation by evaluating the delta expression (branch to 170). The system can also optionally compute the next $E(F_i)$ relation by evaluating the epsilon expression (180).

If computing the greatest fixed point, the system can evaluate the epsilon expression (180) and only optionally evaluate the delta expression (170). In either case, the following update step is the same.

The system computes $F_i$ by adding tuples of the $\Delta(F_i)$ relation to the $F_{i-1}$ relation and optionally removing, from the result, tuples of the $E(F_i)$ relation (190). This is the central update step of differential evaluation, in which the system builds on the relation generated in previous iterations by adding tuples of the $\Delta(F_i)$ relation generated by the delta expression and then removing, from the result, tuples of the $E(F_i)$ relation if epsilon expressions are being used.

On each iteration, the system again determines if a fixed point has been reached (160). If so, the process ends (branch to end).

The system can alternatively test for a fixed point by looking at what the delta expression and, optionally, the epsilon expression generated. If neither expression generated any tuples, a fixed point has been reached.

Evaluating the "ancestor" relation using approximate difference operators will now be described. Because the definition of the "ancestor" relation is monotonic without negation, discussion of computing the epsilon expression is omitted. The initial expression for "ancestor" is repeated here for convenience:

ancestor(x,y):-parent(x,y) OR
exists(z: parent(x,z) AND ancestor(z,y)).

TABLE 1 illustrates, in tabular form, an example parent relation.

TABLE 1

| Parent | Child |
|---|---|
| A | B |
| B | C |

TABLE 1-continued

| Parent | Child |
|---|---|
| C | D |
| D | E |

The data in TABLE 1 can also be represented as a simple linear directed graph:

A→B→C→D→E

By evaluating the "ancestor" expression using this parent relation, a system can derive all of the ancestor relationships represented in the parent relation.

TABLE 2 illustrates the stages of computing the "ancestor" relation using an approximate difference operator. In particular, the example uses the delta expression described above, which was derived from the initial expression:

$\delta$ (ancestor$_{i+1}$(x, y)):-exists z: parent(x, z) AND $\Delta$ (ancestor$_i$(z, y))

TABLE 2

| Relation | Tuples Generated | Remarks |
|---|---|---|
| $F_0$ | Empty | The system initially sets the "ancestor" relation to be the empty relation. |
| $F_1$ | (A, B), (B, C), (C, D), (D, E) | The system computes $F_1$ by evaluating the initial expression on $F_0$. As described above, in this "bootstrapping" step, only the nonrecursive disjunctive term "parent(x, y)" generates any tuples. Thus, all the tuples of the parent relation are added to the "ancestor" relation. In contrast, the existential term is recursive, which generates no tuples with an empty relation as input. |
| $\Delta(F_1)$ | (A, B), (B, C), (C, D), (D, E) | On the first iteration, $\Delta(F_1)$ is generated by computing $F_1 - F_0$. This results in the tuples that were generated for $F_1$. |
| $\Delta(F_2)$ | (A, C), (B, D), (C, E) | The system computes $\Delta(F_2)$ by evaluating the delta expression for "ancestor": $\delta$ (ancestor$_2$(x, y)) :- exists z: parent(x, z) AND $\Delta$ (ancestor$_1$(z, y)) Evaluating the delta expression involves matching up tuples from parent with the tuples generated on the last iteration, which in this case also happen to be the same as the tuples from the parent relation. The result is essentially tuples representing two "steps" in the graphical representation of the parent relation. |
| $F_2$ | (A, B), (B, C), (C, D), (D, E), (A, C), (B, D), (C, E) | The system computes $F_2$ as tuples occurring in $F_1$ or $\Delta(F_2)$. Because the resulting $F_2$ does not equal $F_1$, the system computes another iteration. |
| $\Delta(F_3)$ | (A, D), (B, E) | The system computes $\Delta(F_3)$ by evaluating the delta expression for "ancestor": $\delta$ (ancestor$_3$(x, y)) :- exists z: parent(x, z) AND $\Delta$ (ancestor$_2$(z, y)) On this iteration, evaluating the delta expression involves matching up tuples from parent with the tuples in $\Delta(F_2)$. The tuples in parent are essentially one "step" in the graph, and the tuples in $\Delta(F_2)$ were essentially two "steps" in the graph. Therefore, the result for $\Delta(F_3)$ is essentially tuples that are three "steps" in the graph. |
| $F_3$ | (A, B), (B, C), (C, D), (D, E), (A, C), (B, D), (C, E), (A, D), (B, E) | The system computes $F_3$ as tuples occurring in $F_2$ or $\Delta(F_3)$. Because the resulting $F_3$ does not equal $F_2$, the system computes another iteration. |

TABLE 2-continued

| Relation | Tuples Generated | Remarks |
|---|---|---|
| $\Delta(F_4)$ | (A, E) | The system computes $\Delta(F_3)$ by evaluating the delta expression for "ancestor":<br>$\delta$ (ancestor$_4$(x, y)) :- exists z: parent(x, z) AND $\Delta$ (ancestor$_3$(z, y))<br>On this iteration, evaluating the delta expression involves matching up tuples from parent with the tuples in $\Delta(F_3)$. The tuples in parent are essentially one "step" in the graph, and the tuples in $\Delta(F_2)$ were essentially three "steps" in the graph. Therefore, the result for $\Delta(F_4)$ is essentially tuples that are four "steps" in the graph. |
| $F_4$ | (A, B), (B, C), (C, D), (D, E), (A, C), (B, D), (C, E), (A, D), (B, E), (A, E) | The system computes $F_4$ as tuples occurring in $F_3$ or $\Delta(F_4)$.<br>Because the resulting $F_4$ does not equal $F_3$, the system computes another iteration. |
| $\Delta(F_5)$ | empty | The system computes $\Delta(F_5)$ by evaluating the delta expression for "ancestor":<br>$\delta$ (ancestor$_5$(x, y)) :- exists z: parent(x, z) AND $\Delta$ (ancestor$_4$(z, y))<br>On this iteration, evaluating the delta expression involves matching up tuples from parent with the tuple in $\Delta(F_4)$. The tuples in parent are essentially one "step" in the graph, and the tuples in $\Delta(F_4)$ were essentially four "steps" in the graph. Therefore, the result for $\Delta(F_5)$ would be tuples that are five "steps" in the graph.<br>But no such tuples exist. The only tuple in $\Delta(F_4)$ is (A, E). There is no parent of A, so A can never be the intervening z required for the delta expression. |
| $F_5$ | (A, B), (B, C), (C, D), (D, E), (A, C), (B, D), (C, E), (A, D), (B, E), (A, E) | The system computes $F_5$ as tuples occurring in $F_4$ or $\Delta(F_5)$.<br>Because the resulting $F_5$ equals $F_4$, a fixed point has been reached and the process ends. |

From TABLE 2, it can be seen that the process presents significant advantages over naive evaluation. As one example, on each iteration the number of comparisons to tuples in the parent relation got smaller. That is, for $F_2$ there were three tuples compared to those in the parent relation, for $F_3$ there were two tuples compared to those in the parent relation, and for $F_4$ there was only one tuple compared to those in the parent relation.

This is in direct contrast to naive evaluation. If naive evaluation were performed, the number of comparisons to tuples in the parent relation would continually get larger.

TABLE 3 illustrates how the initial expression would be evaluated using naive evaluation.

TABLE 3

| Relation | Tuples Generated | Remarks |
|---|---|---|
| $F_0$ | Empty | The system initially sets the "ancestor" relation to be the empty relation. |
| $F_1$ | (A, B), (B, C), (C, D), | The system computes $F_1$ by evaluating the initial expression on $F_0$. (4 × 4 comparisons) |

TABLE 3-continued

| Relation | Tuples Generated | Remarks |
|---|---|---|
| | (D, E) | |
| $F_2$ | (A, B), (B, C), (C, D), (D, E), (A, C), (B, D), (C, E), | The system compares all tuples in "ancestor" to all tuples in parent. (4 × 7 comparisons) |
| $F_2$ | (A, B), (B, C), (C, D), (D, E), (A, C), (B, D), (C, E), (A, D), (B, E) | The system compares all tuples in "ancestor" to all tuples in parent. (4 × 9 comparisons) |
| $F_3$ | (A, B), (B, C), (C, D), (D, E), (A, C), (B, D), (C, E), (A, D), (B, E), (A, E) | The system compares all tuples in "ancestor" to all tuples in parent. (4 × 10 comparisons) |

The performance benefit of differential evaluation is apparent even from this small number of iterations. In terms of comparisons, naive evaluation required 120 comparisons (and growing on each iteration), while differential evaluation required 40 comparisons (and shrinking on each iteration). In terms of tuples generated, naive evaluation generated a total of 30 tuples, while differential evaluation generated only 10 tuples.

Figure 2:
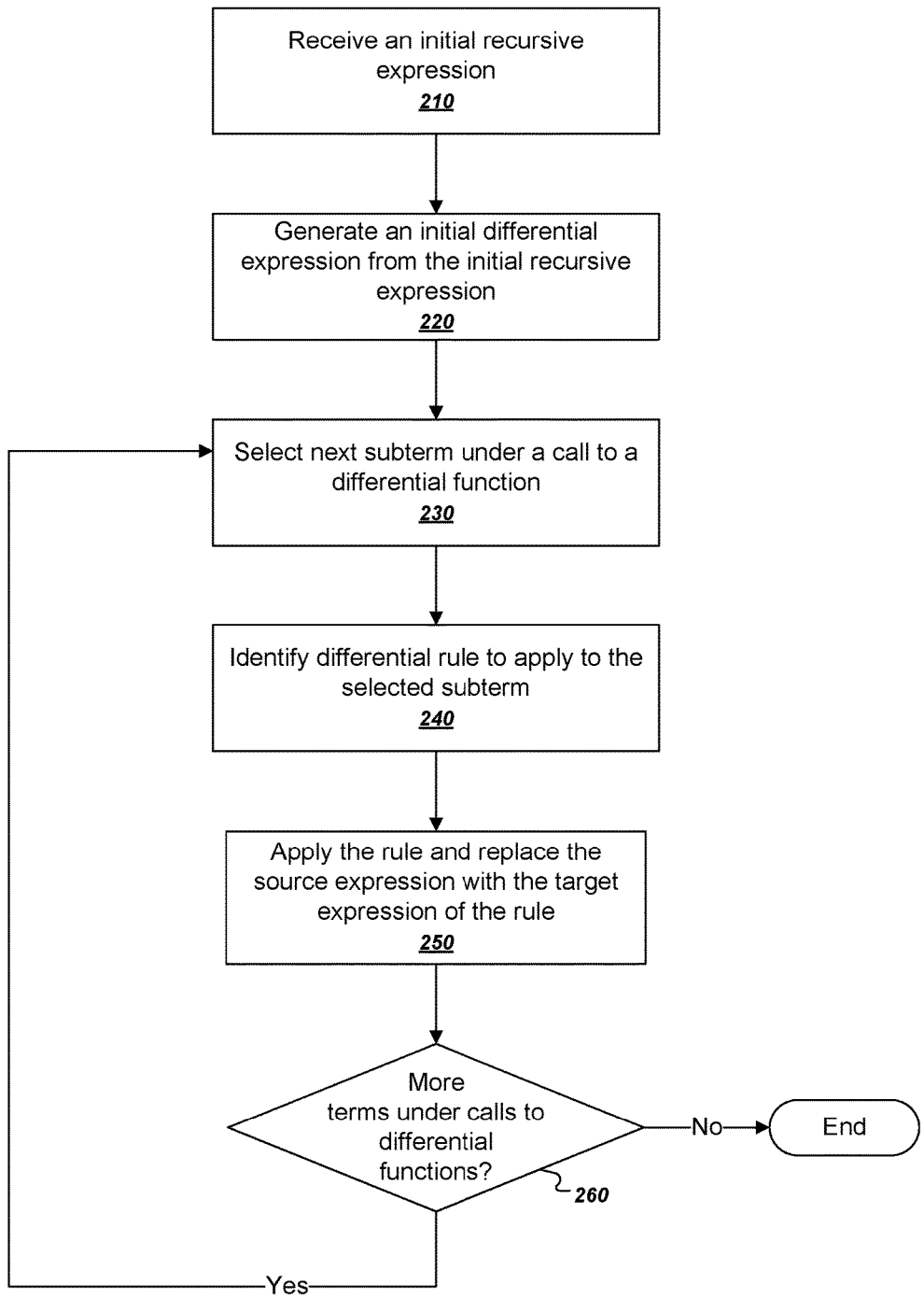
FIG. 2 is a flow chart of an example process for generating a delta expression or an epsilon expression from an initial recursive expression.

FIG. 2 is a flow chart of an example process for generating a delta expression or an epsilon expression from an initial recursive expression. The process is designed to repeatedly transform an initial differential expression to resolve all calls to differential functions. A major advantage of this approach is that the end result is other terms that can still be evaluated and optimized by the evaluation engine just like any other terms. In other words, the system can evaluate the recursive expression by applying differential rules and evaluating the resulting expressions rather than by implementing a special-case evaluation strategy that is different from the normal way that terms are optimized and evaluated. The process will be described as being performed by an appropriately programmed system of one or more computers.

The system receives an initial recursive expression (210).

The system generates an initial differential expression from the initial recursive expression (220). The initial differential expression can be a delta expression or an epsilon expression. The system can use the example process to generate either a delta expression or an epsilon expression to evaluate. If generating both, the system can simply repeat the process twice, once by first generating an initial delta expression, and again by first generating an initial epsilon expression.

Another advantage of this process is that the system can generate a delta expressions and epsilon expressions that are at all times disjoint. In other words, on each iteration, the delta expression will never generate a tuple generated by an epsilon expression and vice versa. This property is useful because it means that the delta and epsilon expressions can be evaluated in any order on each iteration.

The system can generate an initial delta expression by applying a call to the delta function to the initial recursive expression. Similarly, the system can generate an initial epsilon expression by applying a call to the epsilon function to the terms of the initial recursive expression.

The system selects a next subterm having under a call to a differential function (230).

To select a next subterm under a call to a differential function, the system can select the next outermost subterm under a call to a differential function. For example, when considering an expression with nested delta terms, e.g., "δ (X OR δ (Y))", the system can first select the outermost delta subterm, e.g., the subterm that includes "X OR δ (Y)" rather than the subterm that includes just Y. Differential terms connected by ANDS and ORs, e.g., "δ (X) OR δ (Y)" can be treated as being equally outermost, and the system can process these differential terms in any appropriate order.

The system identifies a differential rule to apply to the selected subterm (240). In general, the differential rules that are considered are dictated by the differential function. The system will consider delta rules for a call to the delta function, epsilon rules for a call to the epsilon function, and gamma rules for a call to the gamma function.

The differential rules can be defined so that they do not compete and so that exactly one differential rule will apply to any particular subterm for a single call to a differential function. However, if there are cases where the differential rules can compete, the system can work through the differential rules in a well-defined order to determine whether a pattern in the selected subterm matches the source pattern of each respective delta rule.

The system can then determine, possibly in a specified order of the differential rules, whether the selected subterm has a pattern that matches a pattern of one of the differential rules. As soon as the system finds a matching pattern, the system can apply the rule and stop searching for other rules that may apply.

The system applies the differential rule and replaces the source expression with the target expression of the rule (branch to 250). This effectively resolves the call to the differential function and updates the current differential expression to have the target expression of the differential rule instead of the source expression of the differential rule.

Each differential rule maps a source expression having to a target expression in a computationally sound way that preserves the semantics of upward and downward differences and which tends to reduce the computational burden.

Each differential rule has a source pattern and a target pattern, the effect of which is to change which subterms are under calls to differential functions. Each differential rule can also generate other calls to the delta function, the epsilon function, the gamma function, or some combination of these.

In the usual case, the system can repeatedly transform the initial recursive expression using differential rules so that all calls to differential functions are resolved. In many cases, this replaces recursive calls with calls to the delta relation or the epsilon relation. This was possible, for example, for the "ancestor" expression, in which the call to the delta function was pushed through the expression so that only the recursive term was under a call to the delta function, e.g.:

δ (ancestor(x, y)):-exists z: parent(x, z) AND δ (ancestor (z, y)), which then became an expression with a call to the delta relation instead of an expression with a recursive term:

δ (ancestor(x, y)):-exists z: parent(x, z) AND Δ (ancestor (z, y)).

Another advantage of this approach to differential evaluation is its robustness. In the usual case, the calls to differential functions can be pushed through the initial expression so that they apply only to recursive calls. However, even if this is not possible, the expression can still be evaluated correctly because the rules preserve the computational soundness of the initial delta expression. In other words, if for some reason any terms are still under a call to a differential function when evaluation starts, the system can simply disregard the call and treat the terms as normal terms.

The system determines whether there are more terms under calls to differential functions (260). In other words, the system determines whether or not all calls to differential functions have been resolved.

If so, the system obtains a next subterm under a call to a differential function (branch to 230).

If not, the process ends (branch to end).

TABLE 4 illustrates an example set of delta rules. The delta rules in TABLE 4 represent one possibility of many among computationally sound implementations of differential evaluation. As an example, a system in which it is expensive to store values can prioritize using delta rules that tend to eliminate as many terms as possible.

TABLE 4

| Source Delta Expression | Target Delta Expression |
|---|---|
| δ (false) | false |
| δ (true) | false |
| δ (P) | Δ (P) |
| δ (T OR U) | δ (T) OR δ (U) |
| δ (T AND U) | (δ (T) AND γ (U)) OR (δ (U) AND γ (T)) |
| δ (NOT T) | ε (T) |
| δ (exists(x:T)) | exists(x:δ (T)) |

The following delta rule may be referred to as the false delta rule:

δ (false)=false

False is equivalent to an empty relation. For a source expression that is always false, its associated relation is always empty, which means that it cannot generate new tuples or upward differences. Thus, the target expression becomes false. This rule acts to discards combinations of terms that do not affect the final result. For example, if for some reason an initial expression has a combination that is always false the false delta rule can effectively remove these terms from the delta expression.

The following delta rule may be referred to as the true delta rule:

δ (true)=false

For a source expression that is always true, no new tuples can be generated, and thus there are no upward differences. Therefore, terms that are always true cannot affect the final result. Therefore, the system does not need to reevaluate terms that are always true on every iteration. This delta rule can thus effectively remove these terms from the delta expression.

The following delta rule may be referred to as the relations delta rule:

δ(P)=Δ(P)

This rule means that when the source expression is a call to a particular relation, the upward differences are the tuples in the delta relation Δ(P) for the particular relation P. But only recursive terms have nonempty delta relations. Therefore, the system can treat nonrecursive terms as if they have no delta relation, or alternatively as if they have a delta relation that is always empty. This delta rule can thus effectively remove nonrecursive disjunctive terms from the delta expression, as was the case for the first term in the "ancestor" definition, "parent(x,y)". Therefore, the relations delta can be written piece-wise as follows:

$\delta$ (P)=$\Delta$(P), if P is recursive, and $\delta$ (P)=false, if P is nonrecursive.

The following delta rule may be referred to as the disjunctive delta rule:

$\delta$ (T OR U)=$\delta$ (T) OR $\delta$ (U)

When a subterm has a disjunction, upward differences can be generated on each iteration from one subterm or the other subterm.

The following example illustrates how this rule can make an approximate difference operator generate a different result than an exact difference operator would.

Suppose that $T_1$={1} and $U_1$={ }

On iteration 2, suppose that $\Delta(T_2)$={ } and $\Delta(U_2)$={1}

Then, $\delta$ (T OR U)=$\delta$ (T) OR $\delta$ (U) (from the disjunctive delta rule).

And $\delta$ (T) OR $\delta$ (U)=$\Delta$(T) OR $\Delta$(U) (from the relations delta rule).

Therefore, $\delta$ (T OR U)={1}

However, {1} already existed in $T_1$. Therefore, an exact difference operator would have generated a different result, namely { }. However, this would have required computing the "AND NOT" between the disjunction of the delta relations and each of T and U.

At first glance, this delta rule may seem like a mathematical definition, but it is not. Rather, this particular disjunctive delta rule is actually a carefully designed approximate difference operator that reflects the empirical fact that it is often better to incur some duplication than it is to perform multi-stage computations to compute more exact differences.

In particular, from this delta rule, $\delta$ (T) can generate some terms that were already in U. Likewise, $\delta$ (U) can generate some terms that were already in T. Therefore, this delta rule generates an approximate difference operator because the result does not generate exact differences.

Figure 3:
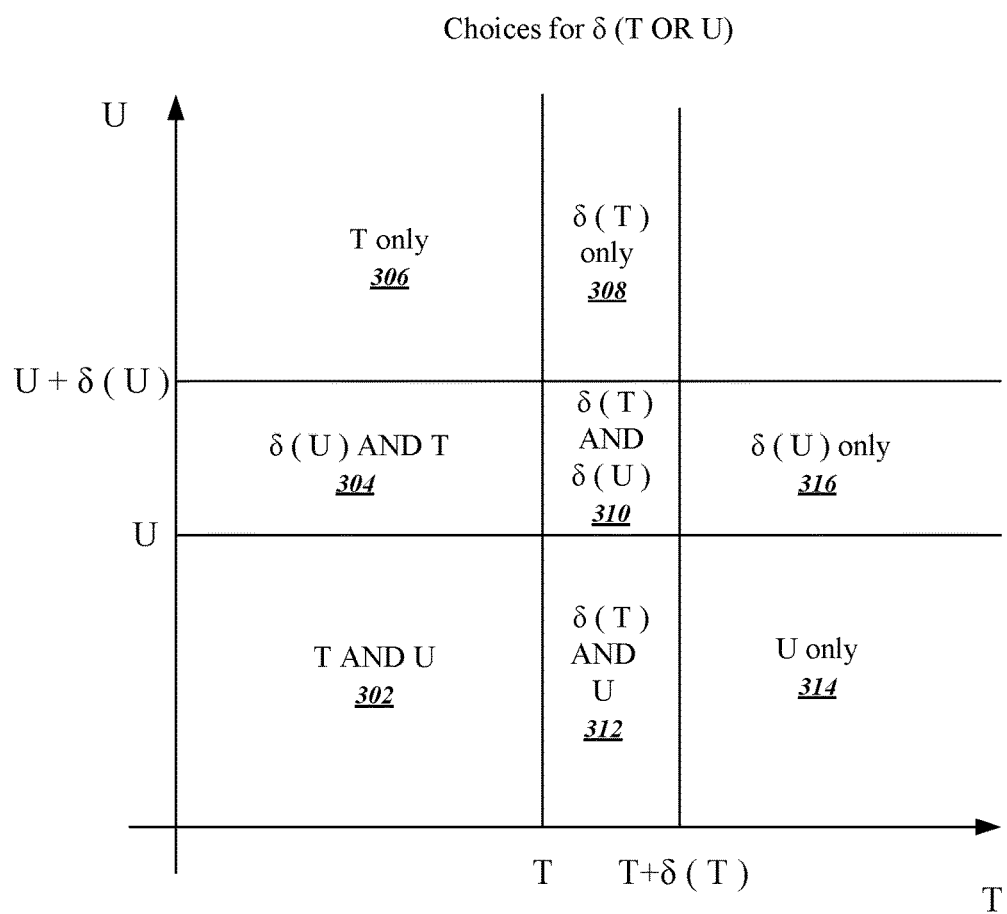
FIG. 3 is a conceptual illustration of how underlying relations change with different disjunctive delta rule choices.

FIG. 3 is a conceptual illustration of how the underlying relations change with different disjunctive delta rule choices. The T-axis represents the size of T and the U-axis represents the size of U.

Initially, the relation corresponding to the expression "(T OR U)" includes the L-shaped region that includes regions 306, 304, 302, 312, and 314.

The upward differences for U result in more tuples in U, represented by the "U+$\delta$ (U)" mark farther up the U-axis. Similarly, the upward differences for T result in more tuples in T, represented by the "T+$\delta$ (T)" mark farther along the T-axis.

The disjunctive delta rule described above, $\delta$ (T OR U)=$\delta$ (T) OR $\delta$ (U), corresponds to the cross-shaped region in the middle, e.g., regions 304, 308, 316, 312, and 310. FIG. 3 illustrates why this is an approximate difference. Namely, the cross-shaped region corresponding to "$\delta$ (T) OR $\delta$ (U)" can include some tuples that were already in T, e.g., region 304 corresponding to "$\delta$ (U) AND T". Likewise, the cross-shaped region can also include some tuples that were already in U, e.g., region 312 corresponding to "$\delta$ (T) AND U".

To reduce the potential for duplication, as one potential alternative, the system could use the following disjunctive delta rule:

$\delta$ (T OR U)=($\delta$ (T) AND NOT U)
OR
($\delta$ (U) AND NOT T)

This disjunctive rule generates a more precise approximate difference operator than the disjunctive delta rule described above. In particular, the resulting delta expression now explicitly excludes, from $\delta$ (T), tuples that are already in U as well as explicitly excluding from $\delta$ (U) tuples that are already in T.

From the illustration in FIG. 3, this explicitly excludes tuples in regions 304 and 312. In other words, this alternative approximate difference operator corresponds to only the smaller L-shaped region formed by regions 308, 310, and 316.

However, in practice, expressions resulting from this alternative disjunctive delta rule can be more expensive to compute than the previous disjunctive delta rule. For one thing, U and T might be huge, which makes determining whether or not something is in them expensive. Secondly, computing each of the subterms involves two steps, one of which may require a negation. For example, computing "$\delta$ (T) AND NOT U" requires (1) first computing what's in $\delta$ (T) and then (2) removing things in $\delta$ (T) that were already in U. Noticeably, the negation constrains the order in which these steps have to be performed because often it is not possible to compute everything that is not in U because what's not in U can be in fact infinite (and not just very large).

All of these considerations illustrate how less precise approximate difference operators, e.g., "$\delta$ (T) OR $\delta$ (U)", more desirable in many situations, even if the sacrifice in precision incurs more duplication than some other alternatives.

The following delta rule may be referred to as the conjunctive delta rule:

$\delta$ (T AND U)=($\delta$ (T) AND $\gamma$ (U))
OR
($\delta$ (U) AND $\gamma$ (T))

When a delta term has a conjunction, upward differences can be generated on each iteration either because: (1) a new tuple from T matched a new tuple for U or a tuple already in U, or (2) a new tuple from U matched a new tuple in T or a tuple already in T.

As described above, the updated versions of the subterms are represented here by a gamma term "$\gamma$ (X)", whose definition is repeated here for convenience:

$\gamma$ (X)=(X OR $\delta$ (X)) AND NOT $\epsilon$ (X).

The following delta rule may be referred to as the negated delta rule:

$\delta$ (NOT T)=$\epsilon$ (T)

The delta of a negated term is simply the epsilon of the term.

The following delta rule may be referred to as the existential delta rule:

$\delta$ (exists(x: T))=exists(x: $\delta$ (T))

This rule means that upward differences generated by an existential term are tuples generated by upward differences of a subterm T of the existential term.

For query languages that support universal quantifiers, the system can optionally use the following delta rule, which may be referred to as the universal delta rule:

$\delta$ (forall(x: T))=exists(x: $\delta$ (T)) AND forall(x: $\gamma$ (X))

TABLE 6 illustrates an example set of epsilon rules. The epsilon rules in TABLE 6 represent one possibility of many among computationally sound implementations of differential evaluation. Which rules a system actually uses depends on its particular priorities.

TABLE 6

| Source Epsilon Expression | Target Epsilon Expression |
| --- | --- |
| ε (false) | false |
| ε (true) | false |
| ε (P) | E (P) |
| ε (T OR U) | (ε (T) AND NOT γ (U)) OR (ε (U) AND NOT γ (T)) |
| ε (T AND U) | (ε (T) AND U) OR (T AND ε (U)) |
| ε (NOT T) | δ (T) |
| ε (exists(x:T)) | exists(x:ε (T)) AND NOT exists(x:γ (T)) |

The following epsilon rule may be referred to as the false epsilon rule:

ε (false)=false

For a source expression that is always false, no tuples can be removed, and thus there are no downward differences. Thus, the target expression becomes false. This rule acts to discards combinations of terms that do not affect the final result. For example, if for some reason an initial expression has a combination that is always false, e.g., "A AND NOT A," this epsilon rule can effectively remove these terms from the epsilon expression.

The following epsilon rule may be referred to as the true epsilon rule:

ε (true)=false

For a source expression that is always true, no tuples can be removed, and thus there are no downward differences. Therefore, terms that are always true cannot affect the final result. Therefore, the system does not need to reevaluate terms that are always true on every iteration. This epsilon rule can thus effectively remove these terms from the epsilon expression.

The following epsilon rule may be referred to as the relations epsilon rule:

ε (P)=E (P)

This rule means that when the source expression is a call to a particular relation, the upward differences are the tuples in the epsilon relation E (P) for the particular relation P. But only recursive terms have nonempty epsilon relations. Therefore, the system can treat nonrecursive terms as if they have no epsilon relation, or alternatively as if they have a epsilon relation that is always empty. This epsilon rule can thus effectively remove nonrecursive disjunctive terms from the epsilon expression, as was the case for the first term in the "ancestor" definition, "parent(x,y)". Therefore, the relations epsilon can be written piece-wise as follows:

ε (P)=E (P), if P is recursive, and

ε (P)=false, if P is nonrecursive.

The following epsilon rule may be referred to as the disjunctive epsilon rule:

ε (T OR U)=(ε (T) AND NOT γ (U))
OR
(ε (U) AND NOT γ (T))

When an epsilon term has a disjunction, downward differences can be generated on each iteration either because: (1) a downward tuple from T did not match a downward tuple for U or a tuple already in U, or (2) a downward tuple from U matched a downward tuple for T or a tuple already in T.

One may notice that the disjunctive epsilon rule is asymmetrical to the disjunctive delta rule. There are practical reasons for this.

For example, consider the following alternative epsilon rule:

ε (T OR U)=ε (T) OR ε (U)

At first glance, this may look easier to compute that the previous disjunctive epsilon rule. However, one complication is that ε (T) and ε (U) may not just be very large, but they may in fact be infinite. Therefore, it can become impossible to compute an OR operation when one of the operands is infinite.

Therefore, the epsilon terms in the previous disjunctive epsilon rule are conjunctively constrained by gamma terms. For example, ε (T) is constrained to be only things that do not overlap with γ (U) and ε (U) is constrained to be only things that do not overlap with γ (T). Because of this, even if ε (T) or ε (U) is actually infinite, the system can always first evaluate the gamma terms and then determine which ones do not overlap with the epsilon terms.

The following delta rule may be referred to as the conjunctive epsilon rule:

ε (T AND U)=(ε (T) AND U)
OR
(ε (U) AND T)

When an epsilon term has a conjunction, downward differences can be generated on each iteration either because: (1) a downward tuple from T matched a tuple already in U, or (2) a downward tuple from U matched a tuple already in T.

The following delta rule may be referred to as the negated epsilon rule:

ε (NOT T)=δ (T)

The downward differences of a negated term are simply the upward differences of the term.

The following delta rule may be referred to as the existential epsilon rule:

ε (exists(x: T))=exists(x: ε (T)) AND NOT exists(x: γ (T))

This epsilon rule means that downward differences generated by an existential term are tuples generated by downward differences of a subterm T of the existential term that do not occur in the updated version (gamma) of T.

For programming languages that support universal quantifiers, the system can optionally use the following epsilon rule, which may be referred to as the universal delta rule:

ε (forall(x: T))=forall(x: ε (T))

This epsilon rule means that downward differences generated by a universal term are tuples generated by downward differences of the subterm T of the universal term.

The following section describes gamma rules.

The following gamma rule may be referred to as the relations gamma rule:

γ (X)=X, if X is not recursive

This is because if X does not include a recursive call, the delta terms and epsilon terms for X will not generate any tuples.

The following gamma rule may be referred to as the conjunctive gamma rule:

γ (T AND U)=γ (T) AND γ (U)

The following gamma rule may be referred to as the disjunctive gamma rule:

γ (T OR U)=γ (T) OR γ (U)

The following gamma rule may be referred to as the existential gamma rule:

γ (exists(x: T))=exists(x: γ (T))

The following gamma rule may be referred to as the negated gamma rule:

γ (NOT T)=NOT γ (T),

In fact, these last four gamma rules can be generalized. Whenever an expression having one or more calls is under a call to the gamma function, all calls in the expression can be immediately replaced with corresponding calls to the gamma function.

With these epsilon rules and gamma rules in mind, the following example illustrates the transformation of the initial "ancestor(x,y)" expression into a final delta expression using the delta rules described above.

The initial recursive expression was:
parent(x,y) OR exists(z: parent(x,z) AND ancestor(z,y))

The system can generate an initial delta expression by applying a call to the delta function to the initial recursive expression:
δ (parent(x,y) OR exists(z: parent(x,z) AND ancestor(z, y)))

By the disjunctive delta rule, the delta expression becomes:
δ (parent(x, y)) OR δ (exists (z: parent(x, z) AND ancestor (z, y)))

By the relations delta rule, since "parent(x,y)" is not recursive, the first term can be replaced with "false" and therefore dropped entirely, and the delta expression thus becomes:
δ (exists (z: parent(x, z) AND ancestor(z, y)))

By the existential delta rule, the delta expression becomes:
exists (z: δ (parent(x, z) AND ancestor(z, y)))

By the conjunctive delta rule, the delta expression becomes:
exists(z: (S (parent(x, z)) AND γ (ancestor(z, y))))
OR
(γ (parent(x, z)) AND δ (ancestor(z, y))))

By the relations delta rule, since "parent" is not recursive, the delta expression becomes:
exists z: (false AND γ (ancestor(z, y))))
OR
(γ (parent(x, z)) AND δ (ancestor(z, y)))

By the false delta rule, since "false AND X" is always false, the delta expression becomes:
exists(z: (γ (parent(x, z)) AND δ (ancestor(z, y)))

By the relations gamma rule, since parent is not recursive, the delta expression becomes:
exists(z: (parent(x, z) AND δ (ancestor(z, y))

By the relations delta rule, the final delta expression becomes:
exists(z: (parent(x, z) AND Δ (ancestor(z, y))

The system can now evaluate "ancestor(x,y)" using the final delta expression as described above with reference to FIG. 1 and TABLE 2.

The following example illustrates the transformation of the initial "ancestor(x,y)" expression into a final epsilon expression using the epsilon rules described above.

The initial recursive expression was:
parent(x,y) OR exists(z: parent(x,z) AND ancestor(z,y))

The system can generate an initial epsilon expression by applying a call to the epsilon function to the initial recursive expression:
ε (parent(x,y) OR exists(z: parent(x,z) AND ancestor(z, y)))

By the disjunctive epsilon rule, the epsilon expression becomes:
ε (parent(x, y)) AND NOT γ (exists (z: parent(x, z) AND ancestor(z, y)))
OR
NOT γ (parent(x, y)) AND ε (exists(z: parent(x, z) AND ancestor(z, y)))

By the relations epsilon rule, since "parent(x,y)" is not recursive and thus does not have downward differences, the first term on the first line can be replaced with false, and the epsilon expression becomes:
false AND NOT γ (exists (z: parent(x, z) AND ancestor(z, y)))
OR
NOT γ (parent(x, y)) AND ε (exists(z: parent(x, z) AND ancestor(z, y)))

By the false epsilon rule, since "false AND X" is also false, the first line can be dropped entirely, and the epsilon expression becomes:
NOT γ (parent(x, y)) AND ε (exists(z: parent(x, z) AND ancestor(z, y)))

By the relations gamma rule, since "parent(x,y)" is not recursive, the gamma term can be replaced with just a call to parent, and the epsilon expression becomes:
NOT parent(x, y) AND ε (exists(z: parent(x, z) AND ancestor(z, y)))

By the existential epsilon rule, the epsilon expression becomes:
NOT parent(x, y)
AND exists(z: ε (parent(x, z) AND ancestor(z, y)))
AND NOT exists(z: γ (parent(x,z) AND ancestor(z,y)))

By the conjunctive epsilon rule, the epsilon expression becomes:
NOT parent(x, y)
AND exists(z:
ε (parent(x, z) AND ancestor(z, y))
OR
(parent(x,z) AND ε (ancestor(z,y))))
AND NOT exists(z: γ (parent(x,z) AND ancestor(z,y)))

By the conjunctive epsilon rule, the epsilon expression becomes:
NOT parent(x, y)
AND exists(z:
(ε (parent(x, z)) AND ancestor(z, y))
OR
(parent(x,z) AND ε (ancestor(z,y))))
OR
(parent(x,z) AND ε (ancestor(z,y))))
AND NOT exists(z: γ (parent(x,z) AND ancestor(z,y)))

By the relations epsilon rule, because "parent(x,z)" is not recursive, "ε (parent(x, z))" becomes false, and by the false epsilon rule, the epsilon expression becomes:
NOT parent(x, y)
AND exists(z:
(parent(x,z) AND ε (ancestor(z,y))))
OR
(parent(x,z) AND ancestor(z,y)))
AND NOT exists(z: γ (parent(x,z) AND ancestor(z,y)))

The two subterms in the existential term are duplicates, thus, one can be dropped, and the expression becomes:
NOT parent(x, y)
AND exists(z:
(parent(x,z) AND ancestor(z,y)))
AND NOT exists(z: γ (parent(x,z) AND ancestor(z,y)))

The relations epsilon rule, because "ancestor(z,y)" is recursive, the expression becomes:
NOT parent(x, y)
AND exists(z:
(parent(x,z) AND E (ancestor(z,y))))
AND NOT exists(z: γ (parent(x,z) AND ancestor(z,y)))

By the conjunctive gamma rule, the expression becomes:
NOT parent(x, y)

AND exists(z:
(parent(x,z) AND E (ancestor(z,y))))
AND NOT exists(z: γ (parent(x,z) AND γ (ancestor(z,y)))
By the relations gamma rule, because "parent(x,z)" is not recursive, the expression becomes:
NOT parent(x, y)
AND exists(z:
(parent(x,z) AND E (ancestor(z,y))))
AND NOT exists(z: parent(x,z) AND γ (ancestor(z,y))

Notably, all calls to the epsilon function and the gamma function were pushed through the expression to be only on the recursive calls to "ancestor".

The following example illustrates how epsilon rules can be used to handle recursive calls under an even number of negations. Consider the following recursive statement, which is from the field of static software analysis.
constant(e):-defined_constants(e) OR
NOT exists(c: subexpr(e,c) AND NOT constant(c))

This statement says that an expression e is constant if it's either in a relation of predefined constants "defined_constants" or if all of its subexpressions are constant. The latter part of the expression is expressed using an existential quantifier instead of a universal quantifier, and means, equivalently, that an expression is constant if none of its subexpressions are not constant.

This example illustrates that transforming a delta expression with negations can result in epsilon terms. The "ancestor(x,y)" definition described above had no negations, and therefore, the transformation of the delta expression for "ancestor(x,y)" did not produce any epsilon terms. And vice versa, the transformation of the epsilon expression for "ancestor(x,y)" did not produce any delta terms.

Generating a delta expression for "constant(e)" using the delta rules and epsilon rules described above may proceed as follows. Some of the intermediate steps are omitted for brevity. The initial delta expression can be generated as:
δ (defined_constants(e)
OR
NOT exists(c: subexpr(e,c) AND NOT constant(c)))

Using the disjunctive delta rule and the relations delta rule, the nonrecursive term "defined_constants(e)" can be dropped, resulting in:
δ (NOT exists(c: subexpr(e,c) AND NOT constant(c))))

By the negated delta rule, the outermost negated term becomes an epsilon term:
ε (exists(c: subexpr(e,c) AND NOT constant(c)))

Although the entire expression is now under a call to the epsilon function, the expression is still a delta expression because the initial step was a call to the delta function. Therefore, this shows that terms under calls to the epsilon function can be part of delta expressions that are evaluated to determine upward differences. In this example, the upward differences come about because of the second negated term.

By the existential epsilon rule, the expression becomes:
exists(c: subexpr(e,c) AND NOT constant(c)))
AND
NOT exists(c: γ (subexpr(e,c) AND NOT constant(c))))
By the conjunctive epsilon rule, the expression becomes:
exists(c:
(ε (subexpr(e,c)) AND NOT constant(c))
OR
(subexpr(e,c) AND ε (NOT constant(c)))
AND
NOT exists(c: γ (subexpr(e,c) AND NOT constant(c))))

By the relations epsilon rule the "ε subexpr(e,c))" term can be dropped because subexpr(e,c) is not recursive. The expression then becomes:
exists(c: subexpr(e,c) AND ε (NOT constant(c)))
AND
NOT exists(c: γ (subexpr(e,c) AND NOT constant(c)))
By the negated epsilon rule, the epsilon term becomes a delta term and the NOT goes away. Thus, the expression becomes:
exists(c: subexpr(e,c) AND δ (constant(c)))
AND
NOT exists(c: γ (subexpr(e,c) AND NOT constant(c)))
And by the relations delta rule, since "constant(c)" is recursive, the delta expression becomes:
exists(c: subexpr(e,c) AND Δ (constant(c)))
AND
NOT exists(c: γ (subexpr(e,c) AND NOT constant(c)))
This delta expression contains a gamma term. By the conjunctive gamma rule, the delta expression becomes
exists(c: subexpr(e,c) AND Δ (constant(c)))
AND
NOT exists(c: γ (subexpr(e,c)) AND γ (NOT constant(c)))
By the relations gamma rule, because "subexpr(e,c)" is not recursive, the delta expression becomes:
exists(c: subexpr(e,c) AND Δ (constant(c)))
AND
NOT exists(c: subexpr(e,c) AND γ (NOT constant(c)))
By the negated gamma rule, the delta expression becomes:
exists(c: subexpr(e,c) AND Δ (constant(c)))
AND
NOT exists(c: subexpr(e,c) AND NOT γ (constant(c)))

The final delta expression includes a gamma term on "constant(c)". As described above, gamma terms are likely to be large. Therefore, the system can be programmed to avoid computing the gamma terms whenever possible.

In this case, for example, the system can be programmed to use the first term as a guard in which the gamma term is actually computed only for things that are new according to the first line of the delta expression, e.g., "exists(c: subexpr(e,c) AND Δ (constant(c)))." Therefore, the system can be configured to compute "exists(c: subexpr(e,c) AND Δ (constant(c)))" first, and if it is non empty, then compute the gamma term for "constant(c)".

An example of evaluating this delta expression on a small dataset will now be described.

Figure 4:
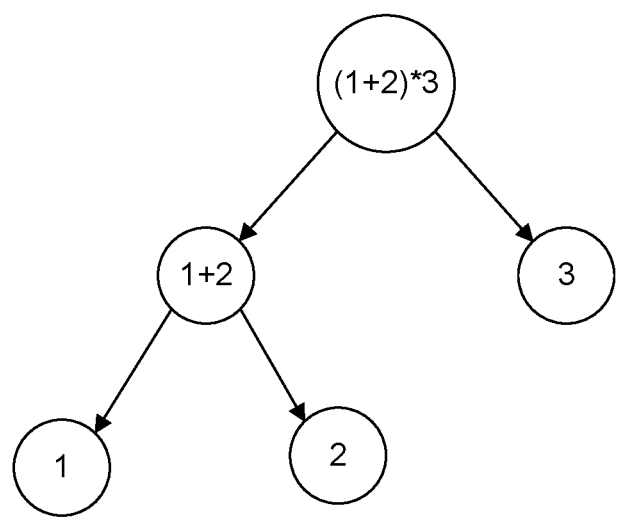
FIG. 4 illustrates an abstract syntax tree (AST) for the expression (1+2)×3.

FIG. 4 illustrates an abstract syntax tree (AST) for the expression (1+2)×3. Assume that this information can be represented by the subexpression relation of TABLE 8. The subexpression relation includes tuples that represent which expressions are subexpressions of another in the AST illustrated in FIG. 4. A second relation, the "defined-constants relation" of TABLE 9, includes tuples that represent expressions that are predefined to be constants.

TABLE 8

Subexpression Relation

| Parent Expression | Child Expression |
|---|---|
| (1 + 2) * 3 | (1 + 2) |
| (1 + 2) * 3 | 3 |
| (1 + 2) | 1 |
| (1 + 2) | 2 |

TABLE 9

Defined-constants Relation 1
2
3

Differential evaluation using the delta expression derived above proceeds as shown in TABLE 10.

TABLE 10

| Relation | Tuples Generated | Remarks |
|---|---|---|
| $F_0$ | Empty | The system initially sets the constants relation to be the empty relation. |
| $F_1$ | ("1"), ("2"), ("3") | The system computes $F_1$ by evaluating the initial expression on $F_0$. In this "bootstrapping" step, only the nonrecursive disjunctive term "defined_constants(e)" generates any tuples. Thus, all the tuples of the defined-constants relation are added to the constants relation. |
| $\Delta(F_1)$ | ("1"), ("2"), ("3") | On the first iteration, $\Delta(F_1)$ is generated by computing $F_1 - F_0$. This results in the tuples that were generated for $F_1$. |
| $\Delta(F_2)$ | ("(1 + 2)") | The system computes $\Delta(F_2)$ by evaluating the delta expression for "constants(e)" generated above: exists(c: subexpr(e, c) AND $\Delta$ (constant(c))) AND NOT exists(c: subexpr(e, c) AND NOT $\gamma$ (constant(c))) The first line evaluates to tuples having children occurring in $\Delta(F_1)$. This results in the expressions "(1 + 2)" and "(1 + 2) × 3" because both of these expressions have children occurring in $\Delta(F_1)$. The system can use the first line as a guard by evaluating the first line and then evaluating the second line only if the first line generated tuples. Thus, next, instead of the system first computing all subexpressions that don't have a child in $\gamma$ (constant(c)), the system only needs to determine which subexpressions generated from the first line don't have a child in constant. Such tuples will be excluded from the constant(e) relation. In this case, "(1 + 2) × 3" generated from the first line does have a child that is not in "$\gamma$ (constant(c))". Thus, it is excluded. On the other hand, "(1 + 2)" has all of its children in "$\gamma$ (constant(c))", so this tuple is generated for $\Delta(F_2)$. |
| $F_2$ | ("1"), ("2"), ("3"), ("(1 + 2)") | The system computes $F_2$ as tuples occurring in $F_1$ or $\Delta(F_2)$. |
| $\Delta(F_3)$ | ("(1 + 2) × 3") | The system computes $\Delta(F_3)$ by evaluating the delta expression for "constant(e)": The first line evaluates to tuples having children occurring in $\Delta(F_2)$. This results in only "(1 + 2) × 3". The system then determines whether the new term "(1 + 2) × 3" has a child not in $\gamma$ (constant(c)). Notably, the system does not try to compute all subexpressions that do not have a child in "$\gamma$ (constant(c))". No such children exist because the subexpressions "(1 + 2)" and "3" both occur in $\gamma$ (constant(c)). Therefore, the system generates "(1 + 2) × 3" for $\Delta(F_3)$. |
| $F_3$ | ("1"), ("2"), ("3"), ("(1 + 2)"), ("(1 + 2) × 3") | The system computes $F_3$ as tuples occurring in $F_2$ or $\Delta(F_3)$. Because the resulting $F_3$ does not equal $F_2$, the system computes another iteration. |

TABLE 10-continued

| Relation | Tuples Generated | Remarks |
|---|---|---|
| $\Delta(F_4)$ | | The system computes $\Delta(F_4)$ by evaluating the delta expression for "constant(e)": Because there are no subexpressions that have "(1 + 2) × 3", the lone tuple in $\Delta(F_3)$, as a child, the result of the first line is empty. Therefore, the system does not need to compute anything at all with respect to "constant(e)". Again, in particular, the system does not try to compute all subexpressions that do not have a child in "$\gamma$ (constant(c))". And the process ends. |

A similar process can be used to differentially evaluate whether or not all leaves of a tree have a particular property. The following recursive statement determines whether or not all leaves of a tree have a particular property:

allChildrenP(node):-(NOT exists(child: edge(node, child)) AND p(node))
OR
(exists(child|edge(node, child))
AND
forall(child|edge(node, child)|allChildrenP(child))))

The first line states that this is true for nodes that do not have children according to an "edge" relation and which have the property according to the "p" relation. The second line and third line recursively states that this is true for nodes with children for whom all of them have such a property according to "allChildrenP".

This statement can be recast using an existential term instead of universal term as follows. This results in an expression having a double negation.

NOT exists(child: edge(node, child)) AND p(node))
OR
(exists (child: edge(node, child))
AND
NOT exists(child: edge(node, child) AND NOT allChildrenP(child))))

A system can transform this expression using the delta rules described above to generate the following delta expression:

(exists(child: edge(node, child) AND $\Delta$ (allChildrenP (child))))
AND
NOT exists(child: edge(node, child) AND NOT $\gamma$ (allChildrenP(child)))

The system can then use this delta expression to differentially evaluate whether or not all leaves of a tree have a particular property.

Another major advantage of performing differential evaluation is the flexibility it provides for adding new programming language features. In particular, if a new language feature is added that will support recursive statements, developers of the language need only to define a new delta rule and a new epsilon rule for the new feature.

One such example of a new recursive language feature is recursive aggregates. An aggregate is an operation that takes as input a number of tuples and produces a single value from the tuples. For example, a "count" operation that takes a set of tuples and produces a count of the tuples in the set is an aggregate operation. Common aggregate operations include, min, max, count, and product, to name just a few examples.

Aggregate operations in general have a range that constrains which tuples the aggregate will be performed over.

Aggregate operations also have a term that defines how values in the tuples will be aggregated.

Some query languages support recursive aggregates. A recursive aggregate construct in a query language can have the following elements:

(1) an aggregation function, e.g., max, sum, count, and so on (2) a result variable that will be equal to the aggregated value (3) a variable, > to_agg> used in the term that identifies which values are to be aggregated (4) local variables that are local to the range and the term (5) a range, which is a relation between free variables and the local variables (6) a term, which is a relation between the local variables and <to_agg> that defines the values to be aggregated by the aggregation function.

The following is an example aggregation construct that can be recursive in the term:

agg*(<result>, <to_agg>|<variables>|<range>|<term>),

This aggregation construct can support recursive calls in the term. An evaluation engine for a particular query language can enforce monotonicity for this recursive aggregation construct by defining the following semantics:

Every tuple in the range will have zero or more values in the recursive term. The aggregation is computed over each combination of values in the term per row in the range. This effectively makes the aggregation a Cartesian product of all possible choices. What this means in practice is that the evaluation engine will not generate partial aggregation results for a particular row in the range. And therefore, this means that the output relation always gets larger, thereby ensuring monotonicity in the recursive term. Computing recursive aggregates using naive evaluation is described in more detail in commonly-owned U.S. Pat. No. 9,015,193, which is herein incorporated by reference in its entirety.

The following is an example of a recursive aggregate expressed in a Datalog-like query language. This recursive aggregate computes the height of each node in a tree based on the respective heights of the node's children.

height(node, h):-

NOT exists(c: child(node, c)) AND h=0

OR h=1+max(p)(c|child(node, c)|height(c, p))

The first line of this expression says that nodes without any children have a height of zero. The second line of this expression says that nodes having children have a height of one plus the maximum height of all their children. The second line has a recursive aggregation construct having the following elements: a "max" aggregation function, the variable p as the <to_agg> variable, c as a local variable, "child(node, c)" as the range, and "height(c, p)" as the recursive term.

Given a framework for evaluating recursive statements using differential evaluation, all the system needs in order to evaluate recursive aggregates is an appropriate set of one or more differential rules for recursive aggregates. Given such an appropriate set of differential rules, the system can then compute a delta expression for "height(node, h)" using a delta rule for recursive aggregates and then evaluate the expression differentially as described above like any other recursive statement.

In some implementations, an evaluation engine can use the following aggregates delta rule:

$\delta$ (agg(p) ((v . . . )|range|term)=exists(p, (v . . . ): range AND $\delta$ (term))

AND $\delta$ (agg(p) ((v . . . )|range|term))

where p is the <to_agg> variable and "(v . . . )" are the local variables.

This delta rule generates a conjunction of two terms. The first term (on the first line in this example) is an existential term that has a subterm that is itself a conjunction of the range and a delta term that is the recursive term of the aggregation construct. In other words, the recursive term is under a call to the delta function "$\delta$ (term)." The second term is a gamma term of the entire original recursive aggregate expression.

As one can see, the aggregates delta rule produces a gamma term, which, as described above, can be large and expensive to compute in many situations. But in practice, an evaluation engine can use the existential term as a guard such that the aggregation construct in the gamma term is evaluated if and only if there are upward differences in the term, and even then using only the results of the existential term as the range of the aggregation construct. In other words, the evaluation engine can evaluate the existential term first. Then, if and only if the result is non-empty, the evaluation engine evaluates the aggregation construct in the gamma term using only results generated by evaluating the existential term.

In some implementations, an evaluation engine can use the following aggregates epsilon rule:

$\epsilon$ (agg(p) ((v . . . )|range|term)=exists(p, (v . . . ): range AND $\epsilon$ (term)

AND

NOT $\gamma$ (agg(p) ((v . . . )|range|term)).

The structure of the aggregates epsilon rule is similar to the delta rule in that it generates a conjunction between an existential term and a gamma term. And similarly to the aggregates delta rule, in practice, an evaluation engine can use the existential term generated by the aggregates epsilon rule as a guard so that the gamma term is only computed if and only if there are actual downward differences in the recursive term and using only those results as the range of the aggregation construct.

The following example illustrates transforming the original recursive "height(node,h)" expression using the aggregates delta rule.

First, the system can generate an initial delta expression by applying a call to the delta function to the definition of "height(node,h)", resulting in the following initial delta expression:

$\delta$ (NOT exists(c: child(node, c) AND h=0

OR h=1+max(p)(c|child(node, c)|height(c, p)))

By the disjunctive delta rule and the relations delta rule, the first term on the first line can be dropped. And the delta expression becomes:

$\delta$ (h=1+max(p)(c|child(node, c)|height(c, p))))

The "max" term is a recursive aggregate. Thus, the system can apply the aggregates delta rule and the delta expression becomes:

exists(c: child(node, c) AND $\delta$ (height(c, p))

AND

1+$\gamma$ (max(p)(c|child(node, c)|height(c, p)))

The system can apply the relations delta rule, resulting in the following final delta expression:

exists(c: child(node, c) AND Δ (height(c, p)))
AND
1+γ (max(p)(c|child(node, c)|height(c, p)))

As described above, the system can now compute "height (c, p)" differentially by evaluating this final delta expression on each iteration instead of the original delta expression on each iteration. And to reiterate what was described above, in practice, the system can use the first existential term as a guard such that the existential term is evaluated first, and the aggregation construct in the gamma term is evaluated if and only if the result of the existential term is non-empty and using those results as the range. In this example, the existential term being non-empty means that there are new tuples in the "height" relation that are children of other tuples according to the "child" relation.

Figure 5:
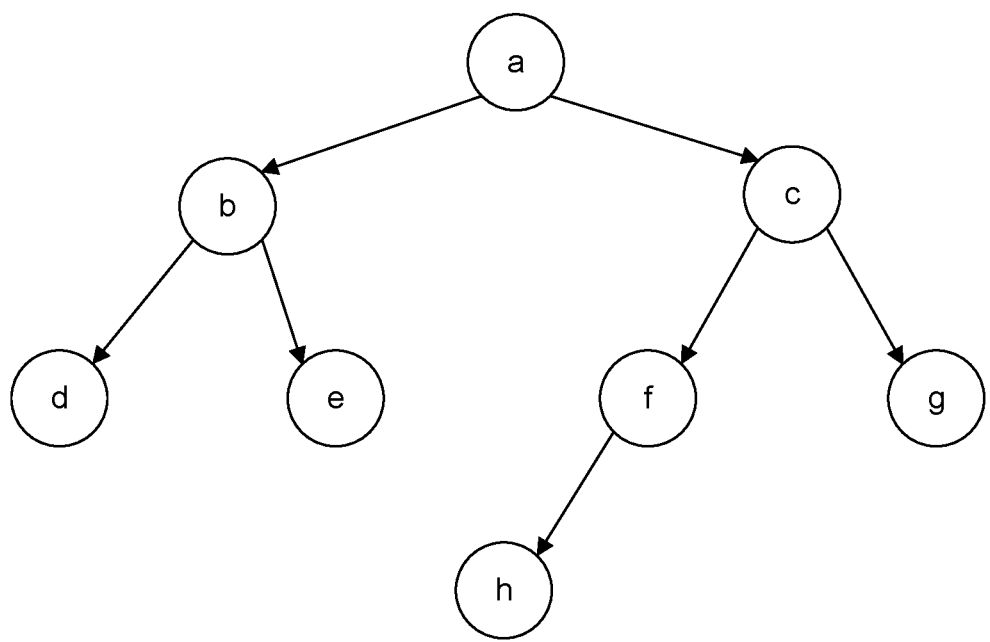
FIG. 5 illustrates nodes in an example "child" relation.

To illustrate a concrete example of evaluating this final delta expression for "height(c, p)", consider the following example "child" relation, which is illustrated graphically in FIG. 5. FIG. 5 illustrates that node a is the root node with two children, nodes b and c. Nodes b and c have two children each, and node f has one child. The remaining nodes are leaf nodes.

TABLE 11

Child Relation

| Node | Child |
|------|-------|
| a | b |
| a | c |
| b | d |
| b | e |
| c | f |
| c | g |
| d | null |
| e | null |
| f | h |
| g | null |
| h | null |

A system can use the final delta expression for "height(c, p)" derived above to differentially evaluate the height of each node of the tree represented by the child relation, which is illustrated by TABLE 12.

TABLE 12

| Relation | Tuples Generated | Remarks |
|----------|------------------|---------|
| $F_0$ | Empty | The system initially sets the constants relation to be the empty relation. |
| $F_1$ | (d, 0), (e, 0), (h, 0), (g, 0) | The system computes $F_1$ by evaluating the initial expression on $F_0$. In the "bootstrapping" step, only the nonrecursive disjunctive term "NOT exists(c: child(node, c))" generates any tuples because $F_0$ is empty. The result is all leaf nodes in the graph. |
| $\Delta(F_1)$ | (d, 0), (e, 0), (h, 0), (g, 0) | On the first iteration, $\Delta(F_1)$ is generated by computing $F_1 - F_0$. This results in the tuples that were generated for $F_1$. |
| $\Delta(F_2)$ | (f, 1), (b, 1) | The system computes $\Delta(F_2)$ by evaluating the delta expression for "height(node, h)" generated above: exists(c: child(node, c) AND Δ (height(c, p))) AND 1 + γ (max(p)(c|child(node, c)|height(c, p))) The existential term evaluates to tuples having children occurring in $\Delta(F_1)$. This results in (f, h), (b, d), (b, e), and (c, e). The semantics of the recursive aggregate means that these results define what the range varies over. In other words, the system can now compute the gamma term using, as the range, results of the existential term. Because the existential term generated by the aggregates delta rule has a call to the delta relation, this means using, as the range, only parents of any newly added tuples according to $\Delta(F_1)$. For this example, when the range is f, the aggregation construct in the gamma term aggregates over all the children of f and their respective heights. The only child of f is h, which has a height of zero. Thus, only (h, 0) is generated. To compute the aggregation function, the system thus generates: (f, 1 + max({0})) = (f, 1) When the range is b, the aggregation construct in the gamma term aggregates over all the children of b and their associated heights, which is (d, 0) and (e, 0). The system thus generates: (b, 1 + max({0, 0})) = (b, 1) When the range is c, the aggregation construct in the gamma term aggregates over all the children of c and their associated heights, which is (e, 0) and (f, null). In other words, the height for f is undefined at this point. As a result, when the evaluation engine computes the Cartesian product of the aggregation construct in the gamma term, the result is empty because of the null height for f. This is the mechanism that enforces monotonicity in the recursive term of the aggregation construct. Therefore, no result is produced for c at this point. |

TABLE 12-continued

| Relation | Tuples Generated | Remarks |
|---|---|---|
| $F_2$ | (d, 0), (e, 0), (h, 0), (g, 0), (b, 1), (f, 1) | The system computes $F_2$ as tuples occurring in $F_1$ or $\Delta(F_2)$. |
| $\Delta(F_3)$ | (c, 2) | The system computes $\Delta(F_3)$ by evaluating the delta expression for "height(node, h)": exists(c: child(node, c) AND $\Delta$ (height(c, p))) AND 1 + $\gamma$ (max(p)(c\|child(node, c)\|height(c, p))) The existential term evaluates to tuples having children occurring in $\Delta(F_2)$, which are: (a, b), (c, f) When the range is a, the aggregation construct in the gamma term aggregates over all the children of a and their respective heights, which is: (b, 1), (c, null). In this case, c does not have a height yet, and therefore, no result is produced for a. When the range is c, the aggregation construct in the gamma term generates: (f, 1), (g, 0) The system thus generates (c, 1 + max({1, 0})) = (c, 2) |
| $F_3$ | (d, 0), (e, 0), (h, 0), (g, 0), (b, 1), (f, 1), (c, 2) | The system computes $F_3$ as tuples occurring in $F_2$ or $\Delta(F_3)$. Because the resulting $F_3$ does not equal $F_2$, the system computes another iteration. |
| $\Delta(F_4)$ | (a, 3) | The system computes $\Delta(F_4)$ by evaluating the delta expression for "height(node, h)": exists(c: child(node, c) AND $\Delta$ (height(c, p))) AND 1 + $\gamma$ (max(p)(c\|child(node, c)\|height(c, p))) The existential term evaluates to tuples having children occurring in $\Delta(F_3)$, which is: (a, c) When the range is a, the term generates: (b, 1), (c, 2) The system thus generates (a, 1 + max({1, 2})) = (a, 3) |
| $F_4$ | (d, 0), (e, 0), (h, 0), (g, 0), (b, 1), (f, 1), (c, 2), (a, 3) | The system computes $F_4$ as tuples occurring in $F_3$ or $\Delta(F_4)$. Because the resulting $F_4$ does not equal $F_3$, the system computes another iteration. |
| $\Delta(F_5)$ | null | At this point, there are no tuples having children in $\Delta(F_4)$. Therefore, the process ends. |

Table 13 illustrates how differential evaluation of this recursive aggregate compares to naive evaluation in terms of tuples produced on each iteration.

TABLE 13

| Iteration | Tuples produced with differential evaluation | Tuples produced with naive evaluation |
|---|---|---|
| 0 | { } | { } |
| 1 | (d, 0), (e, 0), (h, 0), (g, 0) | (d, 0), (e, 0), (h, 0), (g, 0) |
| 2 | (f, 1), (b1) | (d, 0), (e, 0), (h, 0), (g, 0), (f, 1), (b1) |
| 3 | (c, 2) | (d, 0), (e, 0), (h, 0), (g, 0), (f, 1), (b1), (c, 2) |
| 4 | (a, 3) | (d, 0), (e, 0), (h, 0), (g, 0), (f, 1), (b1), (c, 2), (a, 3) |
| 5 | ( ) | (d, 0), (e, 0), (h, 0), (g, 0), (f, 1), (b1), (c, 2), (a, 3) |

As shown in TABLE 9, naive evaluation recomputes the aggregation construct for every previously generated tuple on every iteration. In addition, the last iteration of naive evaluation completely duplicates the previous iteration in order to determine whether the least fixed point has been reached. In contrast, for differential evaluation, as soon as $\Delta(F_N)$ is empty, the process can end.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving an original recursive expression that defines tuples belonging to an output relation;
generating an initial delta expression from the original recursive expression;
generating a final delta expression including repeatedly applying one or more delta rules to the initial delta expression, wherein each delta rule defines a mapping between (i) a source delta expression having a source delta term and (ii) a target delta expression having one or more target delta terms, and wherein the final delta expression has at least one call to a delta relation that represents tuples generated by the final delta expression on a previous iteration;

initializing the output relation with an initial condition;
evaluating the original recursive expression on the output relation to generate one or more tuples;
computing an initial delta relation as a difference between the one or more tuples and the initial condition; and
until the final delta expression generates no new tuples, performing operations comprising:
  evaluating the final delta expression using the tuples computed by the final delta expression on the previous iteration wherever the call to the delta relation occurs; and
  updating the output relation including adding to the output relation any tuples newly generated by evaluating the final delta expression.

Embodiment 2 is the method of embodiment 1, wherein the original recursive expression is evaluated only once.

Embodiment 3 is the method of any one of embodiments 1-2, wherein on each iteration the final delta expression generates tuples that are new for the iteration, tuples that were already in the output relation, or both.

Embodiment 4 is the method of embodiment 3, wherein evaluating the final delta expression does not involve comparing tuples generated by the final delta expression to tuples that already occur in the output relation.

Embodiment 5 is the method of any one of embodiments 1-4, wherein applying the delta rules eliminates some terms from the delta expression.

Embodiment 6 is the method of any one of embodiments 1-5, wherein evaluating the final delta expression constrains the tuples that are considered in evaluating new tuples on each iteration.

Embodiment 7 is the method of any one of embodiments 1-6, wherein the final delta expression has one or more delta terms and one or more gamma terms, wherein each gamma term represents an updated state of one or more subterms of the gamma term.

Embodiment 8 is the method of embodiment 7, wherein generating the final delta expression comprises applying one or more gamma rules, wherein each gamma rule defines a mapping between (i) a source gamma expression having a source gamma term and (ii) a target gamma expression having one or more target gamma terms.

Embodiment 9 is the method of any one of embodiments 1-8, further comprising:
  generating an initial epsilon expression from the original recursive expression; and
  applying one or more differential rules to the initial epsilon expression to generate a final epsilon expression, wherein the differential rules include delta rules and epsilon rules,
  wherein updating the output relation comprises evaluating the final epsilon expression and removing from the output relation any tuples generated by the final epsilon expression.

Embodiment 10 is the method of embodiment 9, wherein on each iteration the final epsilon expression generates tuples to be removed that occur in the output relation, that do not occur in the output relation, or both.

Embodiment 11 is the method of embodiment 10, wherein evaluating the final epsilon expression does not involve comparing tuples generated by the final epsilon expression to tuples that already occur in the output relation.

Embodiment 12 is the method of any one of embodiments 1-11, wherein the final delta expression includes a conjunction between: (i) a first term having a call to the delta relation, and (ii) a second term having a gamma term, and wherein evaluating the second term comprises evaluating the second term if and only if the first term generates one or more tuples.

Embodiment 13 is the method of embodiment 12, further comprising evaluating the first term before evaluating the second term.

Embodiment 14 is a method comprising:
receiving an original recursive expression that defines tuples belonging to an output relation;
generating an initial epsilon expression from the original recursive expression;
generating a final epsilon expression including applying one or more differential rules to the initial epsilon expression, wherein each differential rule defines a mapping between (i) a source expression and (ii) a target delta expression, and wherein the final epsilon expression has at least one call to an epsilon relation that represents tuples generated by the final epsilon expression on a previous iteration;
initializing the output relation with an initial condition;
evaluating the original recursive expression on the output relation to generate one or more tuples to be removed from the output relation;
computing an initial epsilon relation as the difference between the one or more tuples and the initial condition; and
until the final epsilon expression generates no new tuples, performing operations comprising:
  evaluating the final epsilon expression using the tuples computed by the final epsilon expression on the previous iteration wherever the call to the epsilon relation occurs; and
  updating the output relation including removing from the output relation any tuples generated by evaluating the final epsilon expression.

Embodiment 15 is the method of embodiment 14, wherein the initial condition is a set of all tuples or a set of tuples that is greater than any fixed point.

Embodiment 16 is a method comprising:
one or more computers and one or more storage devices storing instructions that are operable, when executed by the one or more computers, to cause the one or more computers to perform operations comprising:
receiving an original recursive expression that defines tuples belonging to an output relation, wherein the original recursive expression includes a recursive term under a double negation;
generating an initial delta expression from the original recursive expression;
repeatedly applying one or more delta rules and one or more epsilon rules to the initial delta expression, wherein delta rule and each epsilon rule defines a mapping between (i) a source expression having a term, and (ii) a target expression having one or more target terms, to generate a final delta expression having a first term comprising call to a delta relation and a second term that represents an updated state of an output relation for the recursive term;
initializing the output relation with an initial condition;
evaluating the original recursive expression on the output relation to generate one or more tuples;
computing an initial delta relation as a difference between the one or more tuples and the initial condition; and
until the final delta expression generates no new tuples, performing operations comprising:

evaluating the first term of the final delta expression using the tuples computed by the final delta expression on a previous iteration wherever the call to the delta relation occurs, evaluating the second term of the final delta expression using a result of evaluating the first term of the final delta expression, and updating the output relation including adding to the output relation any tuples newly generated by evaluating the second term of the final delta expression.

Embodiment 17 is the method of embodiment 16, wherein the original recursive expression defines when all leaves of a tree have a particular property.

Embodiment 18 is the method of embodiment 17, wherein the recursive term under the double negation in the original recursive expression R has the form:

NOT exists(child: edge(node, child) AND NOT R(child), wherein "edge(node, child)" defines child nodes in the tree.

Embodiment 19 is the method of embodiment 18, wherein the first term of the final delta expression has the form:

exists(child: edge(node, child) AND Δ (R(child)), where "δ (R(child))" represents a call to the delta relation for the original recursive expression.

Embodiment 20 is the method of embodiment 19, wherein the tree is an abstract syntax tree of a programming language statement, and wherein each node in the tree represents a source code expression, and wherein the particular property is being a constant expression.

Embodiment 21 is a method comprising:

one or more computers and one or more storage devices storing instructions that are operable, when executed by the one or more computers, to cause the one or more computers to perform operations comprising:

receiving an original recursive expression that defines tuples belonging to an output relation, wherein the original recursive expression has a recursive aggregation construct, the recursive aggregation construct having a range and a recursive term;

generating an initial delta expression from the original recursive expression;

generating a final delta expression including repeatedly applying one or more differential rules to the initial delta expression, including applying an aggregates delta rule to generate a conjunction of:

(i) an existential term having a subterm that is a conjunction of the range and a delta term that is the recursive term of the aggregation construct, and (ii) a gamma term having a subterm that is the aggregation construct;

evaluating the original recursive expression on an initial condition to generate one or more tuples;

computing an initial delta relation as a difference between the one or more tuples and the initial condition; and until the final delta expression generates no new tuples, performing operations comprising:

evaluating the existential term to generate tuples related by the range and tuples in the delta relation, evaluating the aggregation construct using tuples generated by the existential term as the range of the aggregation construct, and updating the output relation including adding to the output relation any tuples newly generated by evaluating the final delta expression.

Embodiment 22 is the method of embodiment 21, wherein evaluating the aggregation construct comprises evaluating the aggregation construct if and only if the existential term generates one or more tuples.

Embodiment 23 is the method of embodiment 22, wherein the operations further comprise evaluating the existential term before the aggregation construct.

Embodiment 24 is the embodiment of any one of embodiments 21-23, wherein the operations further comprise:

applying an aggregates epsilon rule to the initial delta expression to generate a final epsilon expression having a conjunction of:

(i) an existential term having a subterm that is a conjunction of the range and an epsilon term having a subterm that is the recursive term of the aggregation construct, and (ii) a gamma term having a subterm that is the aggregation construct.

Embodiment 25 is the method of embodiment 24, wherein updating the output relation comprises evaluating the final epsilon expression and removing from the output relation any tuples generated by the final epsilon expression.

Embodiment 26 is the method of any one of embodiments 21-25, wherein the original recursive expression defines a height, a depth, or a number of nodes in a tree-structured graph.

Embodiment 27 is a system comprising: one or more computers and one or more storage devices storing instructions that are operable, when executed by the one or more computers, to cause the one or more computers to perform the method of any one of embodiments 1 to 26.

Embodiment 28 is a computer storage medium encoded with a computer program, the program comprising instructions that are operable, when executed by data processing apparatus, to cause the data processing apparatus to perform the method of any one of embodiments 1 to 26.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
one or more computers and one or more storage devices storing instructions that are operable, when executed by the one or more computers, to cause the one or more computers to perform operations comprising:
receiving an original recursive expression that defines tuples belonging to an output relation;
generating an initial delta expression from the original recursive expression;
generating a final delta expression including repeatedly applying one or more delta rules to the initial delta expression, wherein each delta rule defines a mapping between (i) a source delta expression having a source delta term and (ii) a target delta expression having one or more target delta terms, and wherein the final delta expression has at least one call to a delta relation that represents tuples generated by the final delta expression on a previous iteration;
initializing the output relation with an initial condition;
evaluating the original recursive expression on the output relation to generate one or more tuples;
computing an initial delta relation as a difference between the one or more tuples and the initial condition; and
until the final delta expression generates no new tuples, performing operations comprising:
evaluating the final delta expression using the tuples computed by the final delta expression on the previous iteration wherever the call to the delta relation occurs; and
updating the output relation including adding to the output relation any tuples newly generated by evaluating the final delta expression.

2. The system of claim 1, wherein the original recursive expression is evaluated only once.

3. The system of claim 1, wherein on each iteration the final delta expression generates tuples that are new for the iteration, tuples that were already in the output relation, or both.

4. The system of claim 3, wherein evaluating the final delta expression does not involve comparing tuples generated by the final delta expression to tuples that already occur in the output relation.

5. The system of claim 1, wherein applying the delta rules eliminates some terms from the delta expression.

6. The system of claim 1, wherein evaluating the final delta expression constrains the tuples that are considered in evaluating new tuples on each iteration.

7. The system of claim 1, wherein the final delta expression has one or more delta terms and one or more gamma terms, wherein each gamma term represents an updated state of one or more subterms of the gamma term.

8. The system of claim 7, wherein generating the final delta expression comprises applying one or more gamma rules, wherein each gamma rule defines a mapping between (i) a source gamma expression having a source gamma term and (ii) a target gamma expression having one or more target gamma terms.

9. The system of claim 1, wherein the operations further comprise:
generating an initial epsilon expression from the original recursive expression; and
applying one or more differential rules to the initial epsilon expression to generate a final epsilon expression, wherein the differential rules include delta rules and epsilon rules,
wherein updating the output relation comprises evaluating the final epsilon expression and removing from the output relation any tuples generated by the final epsilon expression.

10. The system of claim 9, wherein on each iteration the final epsilon expression generates tuples to be removed that occur in the output relation, that do not occur in the output relation, or both.

11. The system of claim 10, wherein evaluating the final epsilon expression does not involve comparing tuples generated by the final epsilon expression to tuples that already occur in the output relation.

12. The system of claim 1, wherein the final delta expression includes a conjunction between: (i) a first term having a call to the delta relation, and (ii) a second term having a gamma term,
and wherein evaluating the second term comprises evaluating the second term if and only if the first term generates one or more tuples.

13. The system of claim 12, wherein the operations further comprise evaluating the first term before evaluating the second term.

14. A system comprising:
one or more computers and one or more storage devices storing instructions that are operable, when executed by the one or more computers, to cause the one or more computers to perform operations comprising:
receiving an original recursive expression that defines tuples belonging to an output relation;
generating an initial epsilon expression from the original recursive expression;
generating a final epsilon expression including applying one or more differential rules to the initial epsilon expression, wherein each differential rule defines a mapping between (i) a source expression and (ii) a target delta expression, and wherein the final epsilon expression has at least one call to an epsilon relation that represents tuples generated by the final epsilon expression on a previous iteration;
initializing the output relation with an initial condition;
evaluating the original recursive expression on the output relation to generate one or more tuples to be removed from the output relation;
computing an initial epsilon relation as the difference between the one or more tuples and the initial condition; and
until the final epsilon expression generates no new tuples, performing operations comprising:
evaluating the final epsilon expression using the tuples computed by the final epsilon expression on the previous iteration wherever the call to the epsilon relation occurs; and
updating the output relation including removing from the output relation any tuples generated by evaluating the final epsilon expression.

15. The system of claim 14, wherein the initial condition is a set of all tuples or a set of tuples that is greater than any fixed point.

16. A system comprising:
one or more computers and one or more storage devices storing instructions that are operable, when executed by the one or more computers, to cause the one or more computers to perform operations comprising:

receiving an original recursive expression that defines tuples belonging to an output relation, wherein the original recursive expression includes a recursive term under a double negation;

generating an initial delta expression from the original recursive expression;

repeatedly applying one or more delta rules and one or more epsilon rules to the initial delta expression, wherein delta rule and each epsilon rule defines a mapping between (i) a source expression having a term, and (ii) a target expression having one or more target terms, to generate a final delta expression having a first term comprising call to a delta relation and a second term that represents an updated state of an output relation for the recursive term;

initializing the output relation with an initial condition;

evaluating the original recursive expression on the output relation to generate one or more tuples;

computing an initial delta relation as a difference between the one or more tuples and the initial condition; and until the final delta expression generates no new tuples, performing operations comprising:

evaluating the first term of the final delta expression using the tuples computed by the final delta expression on a previous iteration wherever the call to the delta relation occurs, evaluating the second term of the final delta expression using a result of evaluating the first term of the final delta expression, and updating the output relation including adding to the output relation any tuples newly generated by evaluating the second term of the final delta expression.

17. The system of claim 16, wherein the original recursive expression defines when all leaves of a tree have a particular property.

18. The system of claim 17, wherein the recursive term under the double negation in the original recursive expression R has the form:

NOT exists(child: edge(node, child) AND NOT R(child)), wherein "edge(node, child)" defines child nodes in the tree.

19. The system of claim 18, wherein the first term of the final delta expression has the form:

exists(child: edge(node, child) AND Δ (R(child))), where "Δ (R(child))" represents a call to the delta relation for the original recursive expression.

20. The system of claim 19, wherein the tree is an abstract syntax tree of a programming language statement, and wherein each node in the tree represents a source code expression, and wherein the particular property is being a constant expression.

21. A computer-implemented method comprising:

receiving an original recursive expression that defines tuples belonging to an output relation;

generating an initial delta expression from the original recursive expression;

generating a final delta expression including repeatedly applying one or more delta rules to the initial delta expression, wherein each delta rule defines a mapping between (i) a source delta expression having a source delta term and (ii) a target delta expression having one or more target delta terms, and wherein the final delta expression has at least one call to a delta relation that represents tuples generated by the final delta expression on a previous iteration;

initializing the output relation with an initial condition;

evaluating the original recursive expression on the output relation to generate one or more tuples;

computing an initial delta relation as a difference between the one or more tuples and the initial condition; and until the final delta expression generates no new tuples, performing operations comprising:

evaluating the final delta expression using the tuples computed by the final delta expression on the previous iteration wherever the call to the delta relation occurs; and updating the output relation including adding to the output relation any tuples newly generated by evaluating the final delta expression.

22. The method of claim 21, wherein the original recursive expression is evaluated only once.

23. The method of claim 21, wherein on each iteration the final delta expression generates tuples that are new for the iteration, tuples that were already in the output relation, or both.

24. The method of claim 23, wherein evaluating the final delta expression does not involve comparing tuples generated by the final delta expression to tuples that already occur in the output relation.

25. The method of claim 21, wherein applying the delta rules eliminates some terms from the delta expression.

26. The method of claim 21, wherein evaluating the final delta expression constrains the tuples that are considered in evaluating new tuples on each iteration.

27. The method of claim 21, wherein the final delta expression has one or more delta terms and one or more gamma terms, wherein each gamma term represents an updated state of one or more subterms of the gamma term.

28. The method of claim 27, wherein generating the final delta expression comprises applying one or more gamma rules, wherein each gamma rule defines a mapping between (i) a source gamma expression having a source gamma term and (ii) a target gamma expression having one or more target gamma terms.

29. The method of claim 21, further comprising:

generating an initial epsilon expression from the original recursive expression; and applying one or more differential rules to the initial epsilon expression to generate a final epsilon expression, wherein the differential rules include delta rules and epsilon rules, wherein updating the output relation comprises evaluating the final epsilon expression and removing from the output relation any tuples generated by the final epsilon expression.

30. The method of claim 29, wherein on each iteration the final epsilon expression generates tuples to be removed that occur in the output relation, that do not occur in the output relation, or both.

* * * * *